US010048151B2

(12) United States Patent
Dooley et al.

(10) Patent No.: US 10,048,151 B2
(45) Date of Patent: Aug. 14, 2018

(54) SYSTEMS AND METHODS FOR CONTROL OF MOTION SICKNESS WITHIN A MOVING STRUCTURE DUE TO INFRASOUND PRESSURES

(71) Applicant: Kevin Allan Dooley Inc., Toronto, Ontario (CA)

(72) Inventors: Kevin Allan Dooley, Toronto (CA); Elwood A. Morris, Nanaimo (CA)

(73) Assignee: KEVIN ALLAN DOOLEY, INC., Toronto (CA)

( * ) Notice: Subject to any disclaimer, the term of this patent is extended or adjusted under 35 U.S.C. 154(b) by 801 days.

(21) Appl. No.: 14/478,468

(22) Filed: Sep. 5, 2014

(65) Prior Publication Data

US 2015/0049589 A1 Feb. 19, 2015

Related U.S. Application Data

(63) Continuation-in-part of application No. PCT/CA2014/050601, filed on Jun. 25, 2014.
(Continued)

(51) Int. Cl.
*G01L 19/00* (2006.01)
*G10K 11/178* (2006.01)

(52) U.S. Cl.
CPC ............ *G01L 19/00* (2013.01); *G10K 11/178* (2013.01); *Y02B 10/30* (2013.01)

(58) Field of Classification Search
CPC ........... G01L 19/00; Y02B 10/30; G01V 1/36; G10K 11/178
(Continued)

(56) References Cited

U.S. PATENT DOCUMENTS 2,909,229 A 10/1959 Cross et al.
3,708,251 A 1/1973 Pierro
(Continued)

FOREIGN PATENT DOCUMENTS

DE 19814798 11/1999
DE 102008032697 1/2010
(Continued)

OTHER PUBLICATIONS

Higaki et al., "Dissection of Automobile Interior Noise Spectrum with Emphasis on the Infrasound Region," May 2005, pp. 1-11.*
(Continued)

*Primary Examiner* — Janet Suglo
*Assistant Examiner* — Eyob Hagos
(74) *Attorney, Agent, or Firm* — William J. Clemens; Shumaker, Loop & Kendrick, LLP

(57) ABSTRACT

Systems and methods for controlling a source of physiological affliction within a moving enclosed structure, such as a vehicle, which defines an interior. The system includes: at least one pressure fluctuation generator, at least one pressure sensor located to sense pressure indicative of the interior of the structure; and at least one controller configured to: determine, from the first pressure sensor information, at least one pressure disturbance within the interior of the structure; and control the at least one pressure fluctuation generator to cancel the at least one pressure disturbance within the interior of the structure. In an example, the at least one pressure disturbance includes infrasonic pressure fluctuations (infrasound). In an example, the physiological affliction includes motion sickness or nauseogenicity.

22 Claims, 24 Drawing Sheets

Related U.S. Application Data

(60) Provisional application No. 61/866,614, filed on Aug. 16, 2013.

(58) Field of Classification Search
USPC .............. 702/190, 56, 138, 14, 15, 17, 18; 367/137; 356/28.5; 381/71.4, 73.1, 94.1, 381/86; 285/12, 13
See application file for complete search history.

(56) References Cited

U.S. PATENT DOCUMENTS

| | | | |
|---|---|---|---|
| 3,785,747 | A | 1/1974 | Mayo et al. |
| 3,914,629 | A | 10/1975 | Gardiner |
| 4,473,906 | A | 9/1984 | Warnaka et al. |
| 4,562,589 | A | 12/1985 | Warnaka et al. |
| 4,648,345 | A | 3/1987 | Wham et al. |
| 4,689,821 | A | 8/1987 | Salikuddin et al. |
| 4,831,297 | A | 5/1989 | Taylor et al. |
| 5,219,037 | A | 6/1993 | Smith et al. |
| 5,252,875 | A | 10/1993 | Veronesi et al. |
| 5,690,321 | A | 11/1997 | Seni et al. |
| 5,725,425 | A * | 3/1998 | Rump ............... B60H 1/008 165/249 |
| 6,778,094 | B2 * | 8/2004 | Gustason ......... G08B 21/0446 340/693.9 |
| 7,269,537 | B1 * | 9/2007 | Mattern ................ G01V 1/36 285/12 |
| 7,918,407 | B2 | 4/2011 | Patch |
| 9,109,614 | B1 * | 8/2015 | Fong .................. F15B 21/042 |
| 2006/0171819 | A1 | 8/2006 | Fox et al. |
| 2007/0009728 | A1 | 1/2007 | Aoki et al. |
| 2007/0269695 | A1 * | 11/2007 | Yamazaki ......... H01M 8/04097 429/415 |
| 2009/0178491 | A1 | 7/2009 | McKitterick et al. |
| 2010/0231008 | A1 * | 9/2010 | Bergmiller .............. B60J 7/22 296/217 |
| 2011/0098950 | A1 | 4/2011 | Carr |
| 2012/0073251 | A1 * | 3/2012 | Troxell ............ B01D 46/0068 55/302 |
| 2012/0113754 | A1 * | 5/2012 | Husseiny ............. H04R 27/00 367/139 |
| 2012/0210741 | A1 | 8/2012 | Fujiwara |
| 2013/0142380 | A1 * | 6/2013 | Tada .................. H04R 9/025 381/413 |
| 2013/0158453 | A1 | 6/2013 | Brouillette et al. |
| 2013/0230185 | A1 * | 9/2013 | Osawa ................... B60Q 5/00 381/86 |
| 2013/0230188 | A1 * | 9/2013 | Cornejo Lizarralde ........... H04B 15/00 381/94.1 |
| 2013/0250188 | A1 | 9/2013 | Uehara et al. |
| 2015/0345522 | A1 * | 12/2015 | Fong ................... F15B 21/042 60/659 |

FOREIGN PATENT DOCUMENTS

| | | |
|---|---|---|
| EP | 0189386 | 7/1986 |
| EP | 0434468 A2 | 6/1991 |
| EP | 0434468 A3 | 6/1991 |
| EP | 0928738 A2 | 7/1999 |
| GB | 20130651 | 6/1984 |
| SE | 467077 | 5/1992 |
| WO | 80/02887 | 12/1980 |
| WO | 9700504 | 1/1997 |
| WO | 2013023660 | 2/2013 |

OTHER PUBLICATIONS

McCauley et al., "Motion Sickness Incidence As a Function of the Frequency and Acceleratlion of Vertical Sinusoidal Motion,", Jun. 1973, pp. 1-22.*

Park et al., "The Rotary Subwoofer: A Controllable Infrasound Source," The Journal of the Acoustical Society of America, Apr. 1, 2009, pp. 2006-2012, vol. 125, No. 4, New York, NY.

Eminent Technology Website: Pikiwiki Page About the Rotary Woofer at the Show Denver 2007; TRW-17; "The Worlds First True Subwoofer" Copyright 2005-2011 Eminent Technology/ Infoateminent-Tech.com; http://www.rotarywoofer.com/.

S.S. Nussbaum and S. Reinis; Some Individual Differences in Human Response to Infrasound; Department of Psychology Unversity of Waterloo and Institute for Aerospace Studies University of Toronto; Submitted Apr. 1984; UTIAS Report No. 282; CN ISSN 0082-5255; Jan. 1985.

Kevin A. Dooley; Significant Infrasound Levels a Previously Unrecognized Contaminant in Landmark Motion Sickness Studies; Proceedings of Meetings on Accoustics; vol. 20, 2013; 166th Meeting of the Acoustical Society of America, San Francisco, California Dec. 2-6, 2014; Session 3aNS: Noise; http://acousticalsociety.org/.

Paul D. Schomer, John Erdreich, James Boyl and Pranav Pamidighantam; 5th International Conference on Wind Turbine Noise; Denver Aug. 28-30, 2013; A Proposed Theory to Explain Some Adverse Physiological Effects of the Infrasonic Emissions at Some Wind Farm Sites.

Michael E. McCauley, Jackson W. Royal, C. Dennis Wylie, James F. O'Hanlon, Robert R. Mackie; Motion Sickness Incidence: Exploratory Studies of Habituation, Pitch and Roll, and the Refinement of a Mathematical Model; Prepared for Office of Navel Research, Department of the Navy; Technical Report 1733-2 Contract No. N00014-79-C-0040 Task No. NR 105-841, Apr. 1976.

Matsangas, Panagiotis; The Effect of Mild Motion Sickness and Sophite Syndrome on Multitasking Cognitive Performance; Monterey, California: Naval Postgraduate School; Mar. 2013; Calhoun Institute Archive of the Naval Postgraduate School; http:hdl.handle.net/10945/32865.

* cited by examiner

Graph from McCauley et al. 1976 (Ref 1)

SYSTEMS AND METHODS FOR CONTROL OF MOTION SICKNESS WITHIN A MOVING STRUCTURE DUE TO INFRASOUND PRESSURES

CROSS-REFERENCE TO RELATED APPLICATIONS

This application is a Continuation-In-Part application of PCT Patent Application Number PCT/CA2014/050601 filed Jun. 25, 2014 entitled SYSTEMS AND METHODS FOR CONTROL OF INFRASOUND PRESSURES, which claims the benefit of priority to U.S. Provisional Patent Application Ser. No. 61/866,614 filed Aug. 16, 2013 entitled CONTROL OF INFRASOUND PRESSURES. The disclosures set forth in the referenced applications are incorporated herein by reference in their entireties into the Detailed Description of Example Embodiments below.

TECHNICAL FIELD

Example embodiments generally relate to infrasonic pressure fluctuations (infrasound), and in particular to systems and methods for controlling of infrasound in a moving structure.

BACKGROUND

Infrasonic pressure fluctuations (infrasound) can be described as local very low frequency Barometric pressure fluctuations, and can be generated as a result of either natural or industrial processes as well as air circulation fans and also large wind turbines. Infrasound has been implicated in various issues pertaining to human health effects. For example, Sick Building Syndrome has long been connected to low frequency (inaudible) cyclic pressure fluctuations due to faulty air circulation systems. Medicinal or natural remedies have been used when occupants are feeling unwell as a result of these devices. Another conventional solution is to altogether remove the device which is causing the problem, or to move the occupant to another dwelling far away from the source.

For example, the primary purpose of a wind turbine is to generate electricity from the kinetic power of the wind, while the primary purpose of air circulation fans is to circulate hot or cool air to achieve a specified temperature. Many such industrial devices merely have these primary goals in mind. However, many such devices typically are not designed with infrasound even as a consideration.

Motion sickness can occur in a moving vehicle. For example, in McCauley et al. (Michael E McCauley, Jackson W Royal, C. Dennis Wylie, James F. O'Hanlon, Robert R. Nackie: Motion Sickness Incidence: Exploratory studies of habituation, pitch and roll, and the refinement of a mathematical model. Technical Report 1733-21976 Contract N00014-73-C-0040 April 1976), hereinafter "McCauley et al.", incorporated herein by reference, it was believed the predominant cause of motion sickness to be from movement frequency and acceleration. For example, it has been traditionally thought that vestibular-ocular functions (inner-ear and eye co-ordination) may be disrupted based primarily on acceleration changes, such as in the vehicle. However, merely addressing these variables may be insufficient in understanding how to address the afflictions to the passenger.

Additional difficulties with existing systems may be appreciated in view of the Detailed Description of Example Embodiments, below.

SUMMARY

In an example embodiment, there is provided a system and method for control or cancellation of infrasonic pressure fluctuations (infrasound) inside a structure such as a dwelling, vehicle, etc. The source of the unwanted infrasound disruption may be caused from an industrial process or device such as a large wind turbine, even from seemingly large distances. The source of the unwanted infrasound disruption may be caused by movement of the structure, such as in the case of a vehicle or vessel.

In an example embodiment, there is provided a system for infrasound control of a structure defining an interior. The system includes a reversible compressor including a housing defining an interior opening interface open to the interior of the structure and an exterior opening interface open to an exterior of the structure, and including at least one controllable element to generate positive pressure flows and negative pressure flows between the interior opening interface and the exterior opening interface. The system includes a first pressure sensor located to sense pressure indicative of the interior of the structure, a second pressure sensor located to sense pressure indicative of the exterior of the structure, and at least one controller configured to control the at least one controllable element of the compressor to cancel pressure oscillations within the interior of the structure based on the pressures detected by the first pressure sensor and the second pressure sensor.

In accordance with another example embodiment, there is provided a reversible infrasonic pressure fluctuation (infrasound) generating compressor, including: a housing defining a first opening interface and a second opening interface; a rotor for rotating within the housing including a plurality of blades each having a respective magnet, the plurality of blades formed of resilient material to twist in a range of positive and negative blade angles to generate respective positive and negative airflows between the first opening interface and the second opening interface; a drive device configured to generate positive or negative current; and an electromagnet controllable by the current from the drive device and positioned to create a positive or negative magnetic field to magnetically interact with the magnets to correspondingly twist the respective blades to a corresponding positive or negative blade angle.

In accordance with another example embodiment, there is provided a method for controlling infrasonic pressure fluctuation (infrasound) of a structure defining an interior, including: determining first pressure sensor information indicative of the interior of the structure; determining second pressure sensor information indicative of an exterior of the structure; and controlling, using at least one controller, at least one controllable element of a reversible compressor which defines an interior opening interface open to the interior of the structure and an exterior opening interface open to the exterior of the structure, to cancel pressure oscillations within the interior of the structure based on the determined first and second pressure sensor information.

In another example embodiment, there is provided a system for controlling a source of physiological affliction within a moving enclosed structure defining an interior, including: at least one infrasonic pressure fluctuation (infrasound) generator; at least one pressure sensor located to sense pressure indicative of the interior of the structure; and at least one controller configured to: determine, from pressure sensor information of the at least one pressure sensor, at least one infrasound disturbance within the interior of the structure; and control the at least one infrasound generator to cancel the at least one infrasound disturbance within the interior of the structure.

In another example embodiment, there is provided a method for controlling a source of physiological affliction within a moving enclosed structure defining an interior, including: determining pressure sensor information indicative of the interior of the structure; determining, from the pressure sensor information, at least one infrasonic pressure fluctuation (infrasound) disturbance within the interior of the structure; and controlling, using at least one controller, at least one controllable element of at least one infrasound generator to cancel the at least one infrasound disturbance within the interior of the structure.

In another example embodiment, there is provided a system for controlling a source of motion sickness or nauseogenicity within a moving enclosed structure defining an interior, including: at least one pressure fluctuation generator; at least one pressure sensor located to sense pressure indicative of the interior of the structure; and at least one controller configured to: determine, from pressure sensor information of the at least one pressure sensor, at least one pressure disturbance within the interior of the structure due to movement of the structure; and control the at least one pressure fluctuation generator to cancel the at least one pressure disturbance within the interior of the structure.

In another example embodiment, there is provided a method for controlling a source of motion sickness or nauseogenicity within a moving enclosed structure defining an interior, including: determining pressure sensor information indicative of the interior of the structure; determining, from the pressure sensor information, at least one pressure fluctuation disturbance within the interior of the structure due to movement of the structure; and controlling, using at least one controller, at least one controllable element of at least one pressure fluctuation generator to cancel the at least one pressure fluctuation disturbance within the interior of the structure.

In another example embodiment, there is provided a method for determining an amount of physiological affliction within a moving enclosed structure defining an interior, using at least one controller, including: determining pressure sensor information indicative of the interior of the structure; determining, from the pressure sensor information, at least one pressure fluctuation disturbance within the interior of the structure due to movement of the structure; calculating the amount of physiological affliction using a model based on pressure, frequency, and time of exposure; and storing the calculated amount of physiological affliction to memory.

In accordance with an example embodiment, there is provided at least one controller device for performing any or all of the described methods.

In accordance with an example embodiment, there is provided a non-transitory computer-readable medium containing instructions executable by at least one controller device for performing any or all of the described methods.

BRIEF DESCRIPTION OF THE DRAWINGS

Reference will now be made, by way of example, to the accompanying drawings which show example embodiments, in which.

Similar reference numerals may be used in different figures to denote similar components.

DETAILED DESCRIPTION OF EXAMPLE EMBODIMENTS

Figure 1:
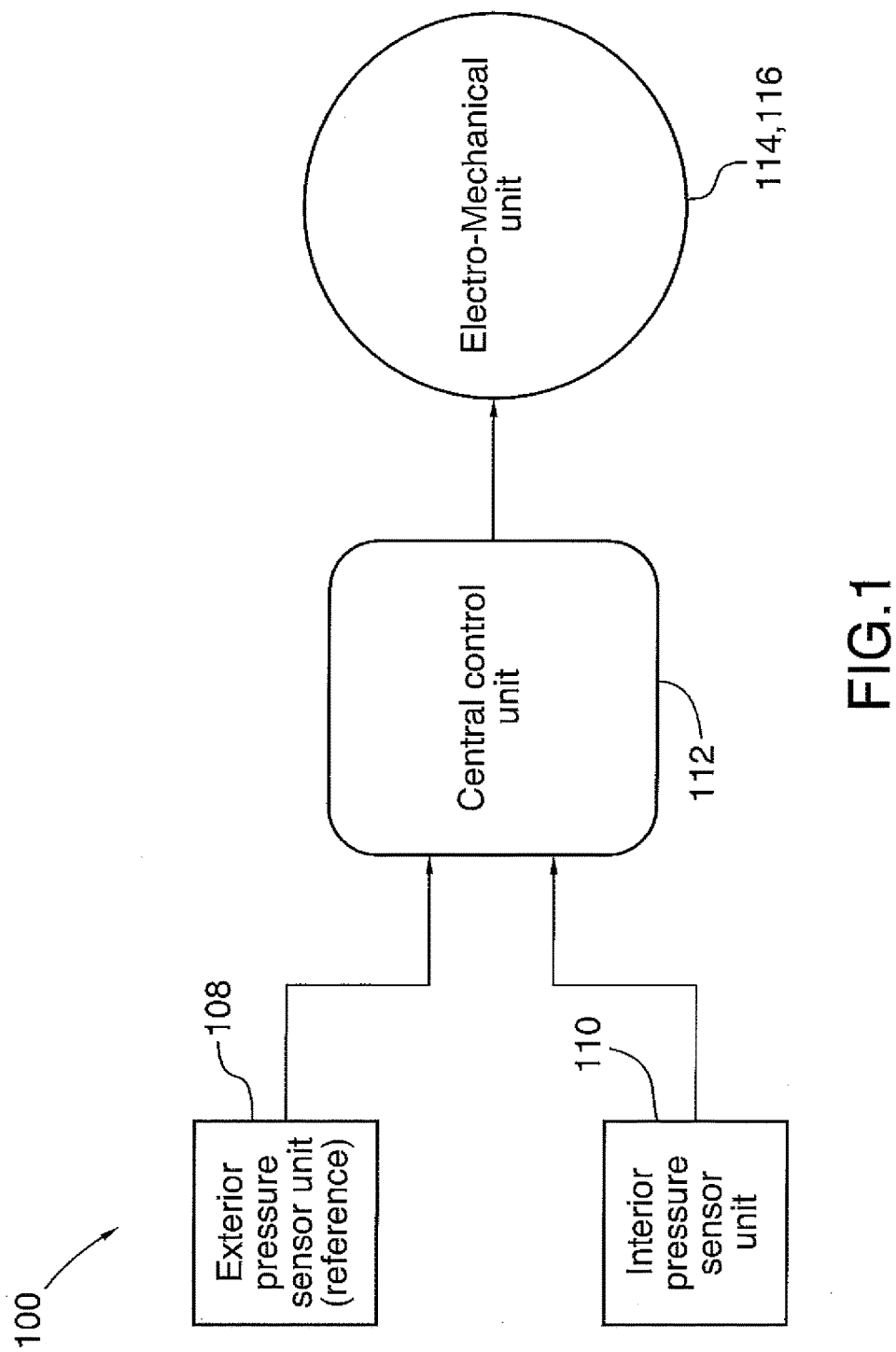
FIG. 1 illustrates a block diagram of a system configured to control infrasonic pressure fluctuations (infrasound) inside a structure, in accordance with an example embodiment.

Neighbors of some types of industrial machines have previously complained of similar symptoms to that of Sick Building Syndrome, which can be traced to infrasonic pressure fluctuations (infrasound). For example, some neighbors of large wind turbine installations appear to be suffering with similar symptoms in their homes following the installation and operation of large wind turbine generators. Measurements and remediation measures in both industrial and sick building situations indicate that cyclic infrasonic pressure fluctuations can be a contributing cause of these symptoms.

It may be advantageous to provide a method of controlling undesired infrasonic pressure fluctuations in structures which are occupied by affected people, without requiring expensive or impractical modification or elimination of the systems generating the infrasound.

In an example embodiment, there is provided a system having an electronically controlled reversible compressor, which is installed between the exterior and interior of a structure such as a dwelling. The reversibility of the compressor flow direction is such that the flow through the compressor is fully controllable from zero to plus or minus a controlled flow rate in a continuously variable fashion at rates that are at least equal to the pressure fluctuation rates arriving inside the structure. In an example embodiment, the harmonic content of the pressure fluctuations is controlled, such as the fundamental harmonic and/or higher order harmonics of the source of the pressure disruption. The system includes an electronic control system including at least one controller which operates in a closed loop such that pressure fluctuations sensed by the pressure sensing system are automatically cancelled by oppositely polarized pressures generated as a function of time by the flow rate and flow direction of the said reversible compressor by delivering air or removing air from the volume of the target structure.

In an example embodiment, there is provided a system for infrasound control of a structure defining an interior. The system includes a reversible compressor including a housing defining an interior opening interface open to the interior of the structure and an exterior opening interface open to an exterior of the structure, and including at least one controllable element to generate positive pressure flows and negative pressure flows between the interior opening interface and the exterior opening interface. The system includes a first pressure sensor located to sense pressure indicative of the interior of the structure, a second pressure sensor located to sense pressure indicative of the exterior of the structure, and at least one controller configured to control the at least one controllable element of the compressor to cancel pressure oscillations within the interior of the structure based on the pressures detected by the first pressure sensor and the second pressure sensor.

In accordance with another example embodiment, there is provided a reversible infrasonic pressure fluctuation (infrasound) generating compressor, including: a housing defining a first opening interface and a second opening interface; a rotor for rotating within the housing including a plurality of blades each having a respective magnet, the plurality of blades formed of resilient material to twist in a range of positive and negative blade angles to generate respective positive and negative airflows between the first opening interface and the second opening interface; a drive device configured to generate positive or negative current; and an electromagnet controllable by the current from the drive device and positioned to create a positive or negative magnetic field to magnetically interact with the magnets to correspondingly twist the respective blades to a corresponding positive or negative blade angle.

In accordance with another example embodiment, there is provided a method for controlling infrasonic pressure fluctuation (infrasound) of a structure defining an interior, including: determining first pressure sensor information indicative of the interior of the structure; determining second pressure sensor information indicative of an exterior of the structure; and controlling, using at least one controller, at least one controllable element of a reversible compressor which defines an interior opening interface open to the interior of the structure and an exterior opening interface open to an exterior of the structure, to cancel pressure oscillations within the interior of the structure based on the determined first and second pressure sensor information.

Figure 2:
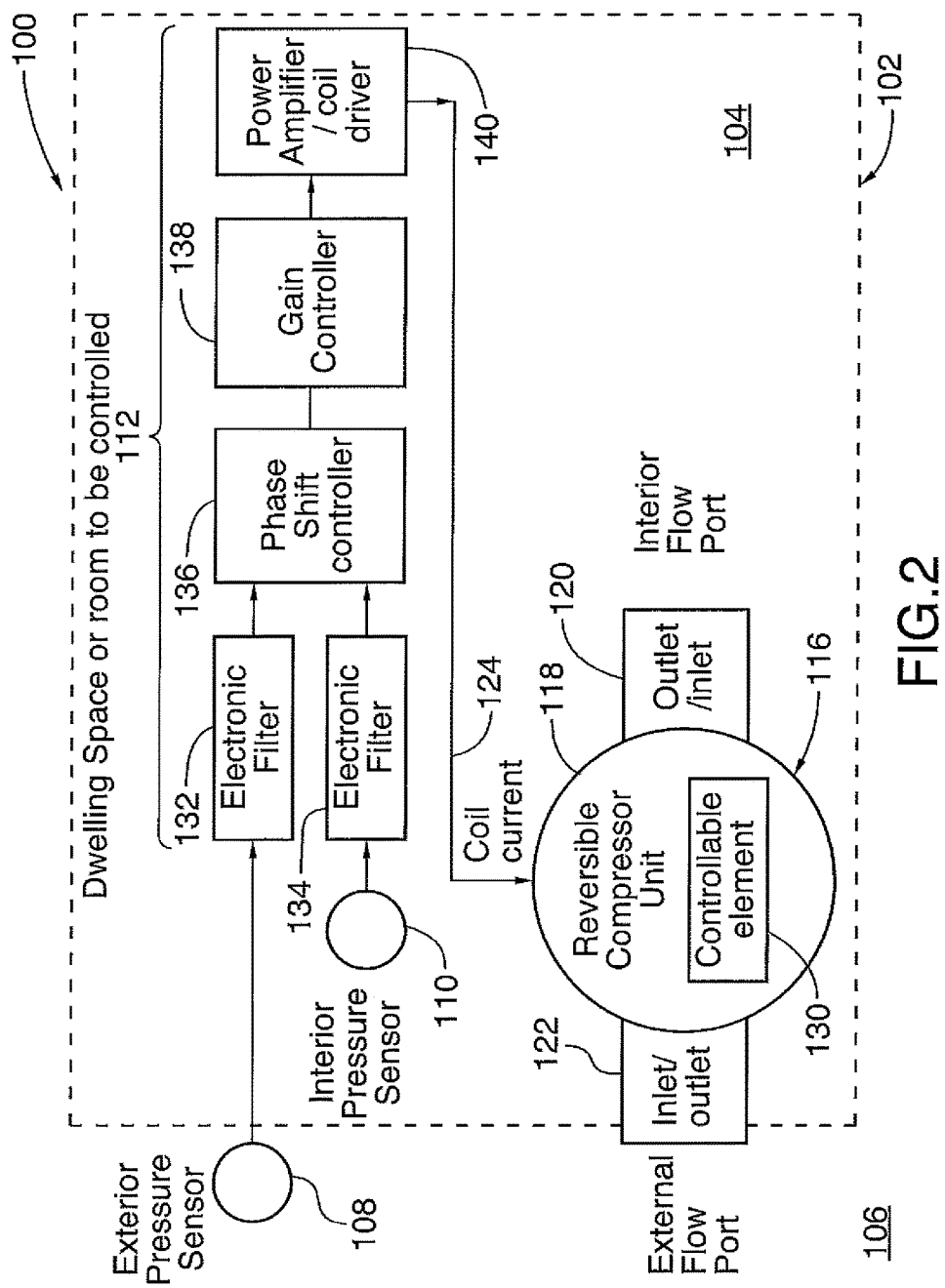
FIG. 2 illustrates a detailed block diagram of the system of FIG. 1.

Reference is first made to FIGS. 1 and 2, which illustrate in block diagram form a system 100 configured to control or cancel infrasonic pressure fluctuations (infrasound) inside a structure 102, in accordance with an example embodiment. In some example embodiments, the structure 102 can be a room, dwelling, building, vehicle, etc., or at least a part thereof. As shown in FIG. 2, the structure 102 defines an interior 104 and has a corresponding exterior 106. In some example embodiments, the exterior 106 may have a source (not shown) of unwanted infrasound, which may be caused from an industrial process or device (not shown) such as a large wind turbine. In other example embodiments, the exterior 106 may be another room or source of unwanted pressure oscillations, such as from an HVAC or utility room, circulating system, propeller, etc., for example.

In accordance with an example embodiment, the system 100 includes an exterior pressure sensor 108, an interior pressure sensor 110, at least one controller 112, and a controllable electro-mechanical unit 114 which includes a reversible compressor 116 or two-way compressor. Generally, the at least one controller 112 is configured to control the compressor 116 to cancel positive and negative pressure oscillations within the interior 104 of the structure 102 based on the pressures detected by the interior pressure sensor 110 and the exterior pressure sensor 108. The pressure within the interior 104 of the structure 102 is controlled at a relatively constant value as a function of time, thereby substantially suppressing undesired pressure disturbances that would be disturbing the interior 104 of the structure 102 from the exterior 106 of the structure 102. At least some of the controller 112 can be part of the compressor, in some example embodiments.

Referring to FIG. 2, the exterior pressure sensor 108 is located to sense pressure indicative of the exterior 106 of the structure 102, and provide an associated signal in proportion to the amount of pressure sensed. This location may be in a volume which is effectively isolated from the control area such as a dwelling attic, or an external or separate building or room, or the outside ambient environment which is also subject to the externally sourced nuisance infrasound. As well, the interior pressure sensor 110 is located to sense pressure indicative of the interior 104 of the structure 102, and provide an associated signal in proportion to the amount of pressure sensed. This is the control environment to be controlled, wherein the pressure is controlled to be relatively constant.

Figure 3:
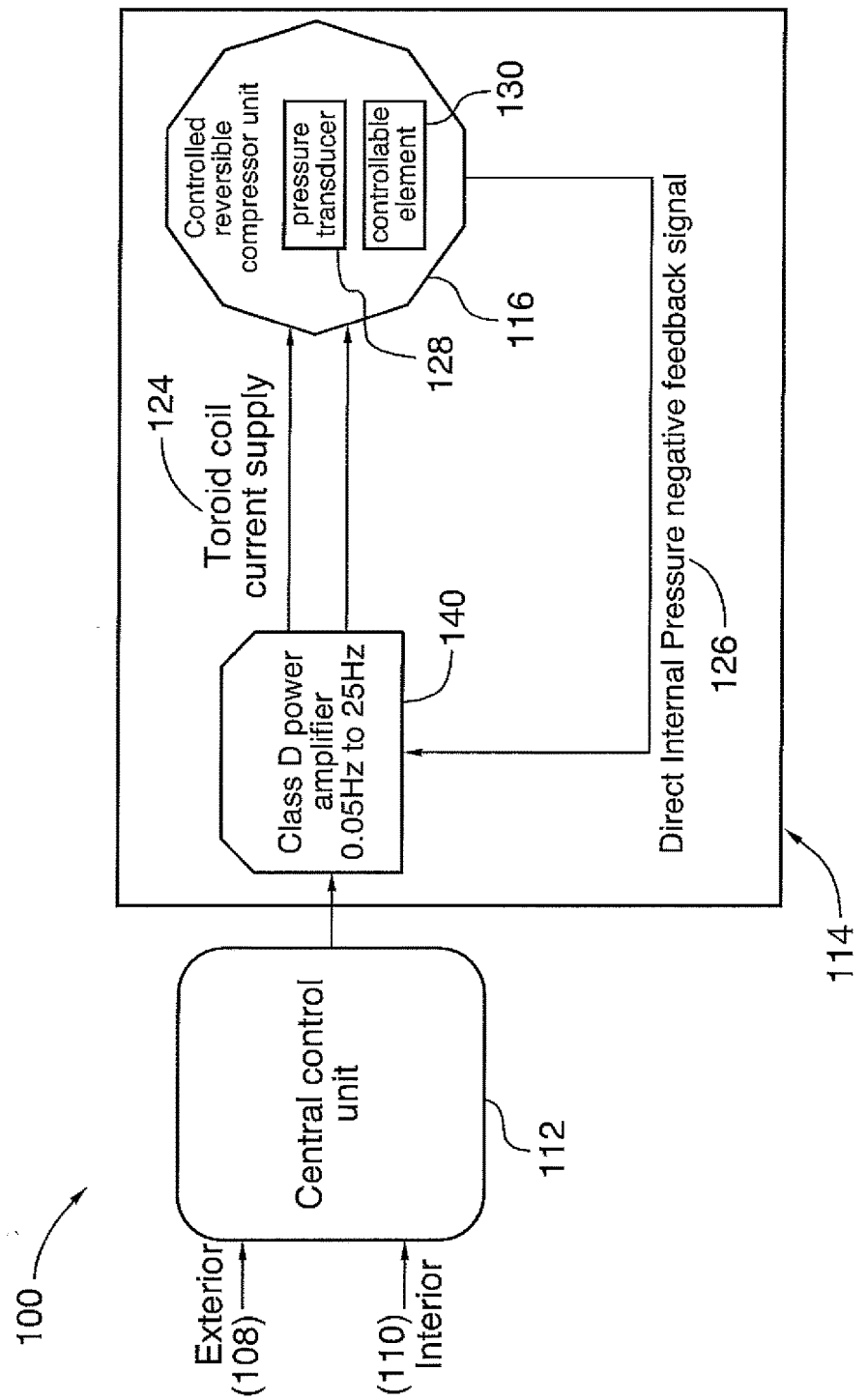
FIG. 3 illustrates another detailed block diagram of the system of FIG. 1, illustrating detail of an electro-mechanical unit.

FIG. 3 illustrates a detailed block diagram of the system 100 of FIG. 1, illustrating detail of the electro-mechanical unit 114. Referring to FIGS. 2 and 3, the compressor 116 includes a housing 118 which defines an interior opening interface 120 open to the interior 104 of the structure 102 and an exterior opening interface 122 open to the exterior 106 of the structure 102. While the compressor 116 is illustrated as being located in the interior 104 of the structure 102, in other example embodiments the compressor 116 is located at the exterior 106 of the structure 102, with the interior opening interface 120 interfacing with the interior 104 from the exterior 106. Within the housing 118, there is at least one controllable element 130 of the compressor 116 such as a magnetic blade or blade (not shown here) that can be controlled by an electromagnet 812 (FIG. 8) driven by a coil current 124 provided from an amplifier 140. In an example embodiment, the compressor 116 also includes its own pressure transducer 128. Referring to FIG. 3, in an example embodiment the at least one controllable element 130 of the compressor 116 is further controlled using a direct internal pressure negative feedback signal 126, using information from the pressure transducer 128, in a negative feedback loop configuration, as shown. This provides that the desired specified amount of current from the controller 112 is being properly performed by the compressor 116. The power amplifier (e.g. class D) is incorporated with a frequency response e.g. down to below 0.05 Hz.

Referring again to FIG. 2, in some example embodiments, the at least one controller 112 can include a number of modules or boxes, and can generally include a first set of one or more electronic filters 132 for signals received from the exterior pressure sensor 108, and a second set of one or more second electronic filters 134 for signals received from the interior pressure sensor 110. The filters 132, 134 can include band-pass filters to filter at least one or numerous harmonics, including a fundamental harmonic, second harmonic, third harmonic, etc. In some example embodiments, the at least one controller 112 can also include at least one phase shift controller 136 to adjust any phase difference between the pressure signals of the exterior pressure sensor 108 and the interior pressure sensor 110. In some example embodiments, the at least one controller 112 can also include at least one gain controller 138 for determining and applying the amount of gain to the signal. In an example embodiment, the resultant signal which is sent to the driver 140 is typically the signal of the external pressure sensor 108, which is processed, inverted, filtered and/or phase shifted, with a gain factor. In an example embodiment, the gain factor is dependent from the pressure signals of the exterior pressure sensor 108 and the interior pressure sensor 110. An inverter (not shown here) can also be used to invert the signal, as appropriate, to cancel the detected interior pressure depending on the particular system setup. The signal (or an inverted signal) from the gain controller 138 is sent to the power amplifier/coil driver 140 to cancel the pressure oscillations within the interior 104. These modules are described in greater detail below.

Figure 4:
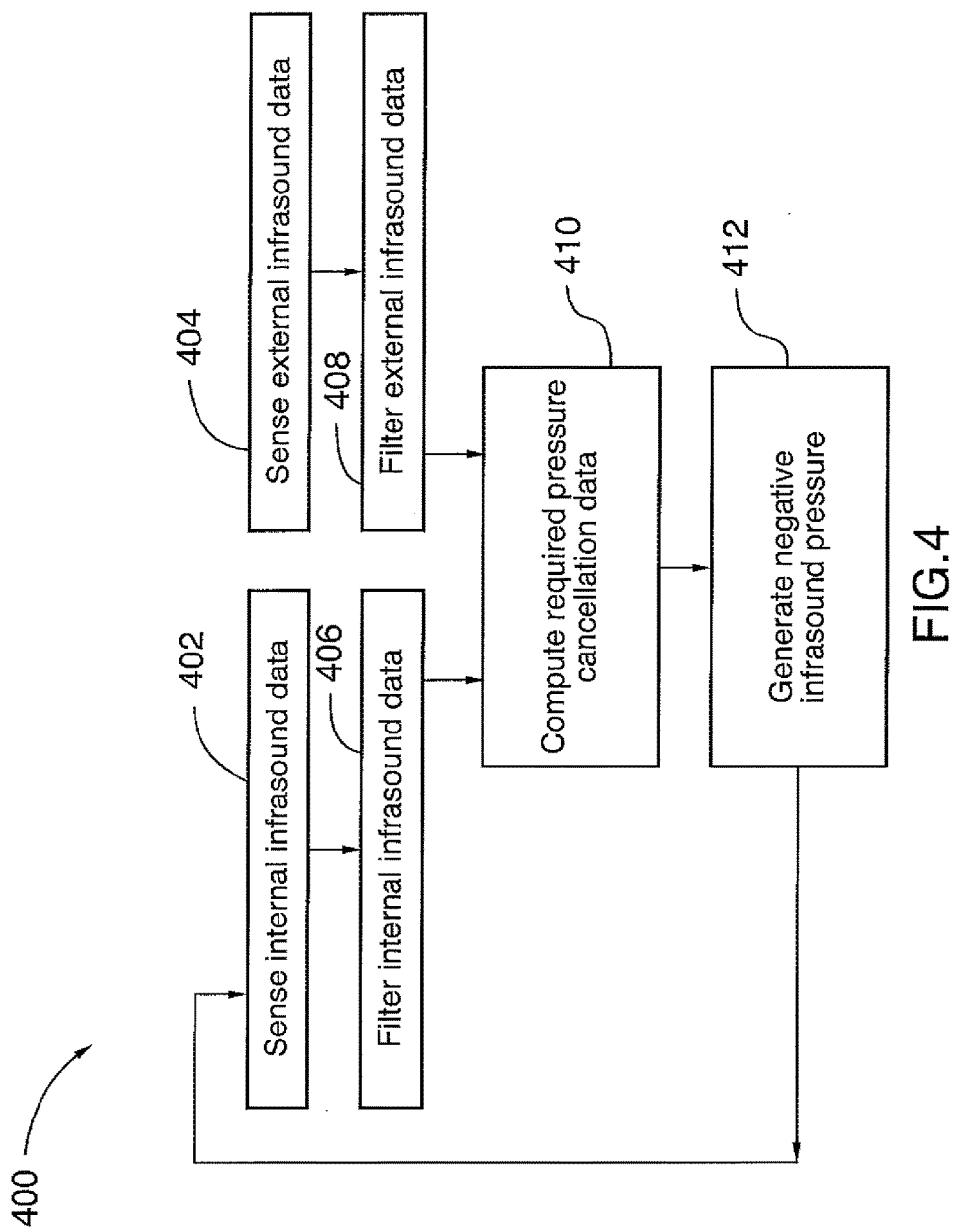
FIG. 4 illustrates a flow diagram of an example method for controlling infrasound, in accordance with an example embodiment.

Reference is now made to FIG. 4, which illustrates a flow diagram of an example method 400 for controlling infrasound of the structure 102 using the system 100 (FIG. 2), in accordance with an example embodiment. At least some of the method 400 may be performed by the at least one controller 112, for example. At event 402, the interior pressure sensor 110 senses the interior pressure, and the at least one controller 112 accordingly determines the pressure sensor information from the interior pressure sensor 110. At event 404, the exterior pressure sensor 108 senses the exterior pressure, and the at least one controller 112 accordingly determines the pressure sensor information from the exterior pressure sensor 108. At event 406, the band pass filter(s) 134 band pass filter specified harmonics from the pressure sensor information indicative of the interior 104 of the structure 102. At event 408, the band pass filters 132 band pass filter specified harmonics from the pressure sensor information indicative of the exterior 106 of the structure 102. Accordingly, this results in at least one order of harmonics that can be individually determined from each of the pressure sensors 108, 110 (FIG. 2).

Still referring to FIG. 4, at event 410, the at least one controller 112 computes the required pressure cancellation data that is required for the compressor 116 to cancel the oscillating disruptions of the interior 104 of the structure 102, based on the determined at least one order of harmonics from each of the pressure sensors 108, 110. This typically requires determining an amount of gain to apply to each of the band pass filtered harmonics of the pressure sensor information indicative of the exterior 106 of the structure 102, phase shifted as appropriate. The amount of gain may be based on the determined first and second pressure sensor information. At event 412, the at least one controller 112 controls the compressor 116 with an amount of drive derived from the exterior pressure sensor signal, band pass filtered and phase shifted to generate the applicable negative infrasound pressure for each of the determined order harmonic, to cancel those pressure harmonics from the control space.

Figure 7:
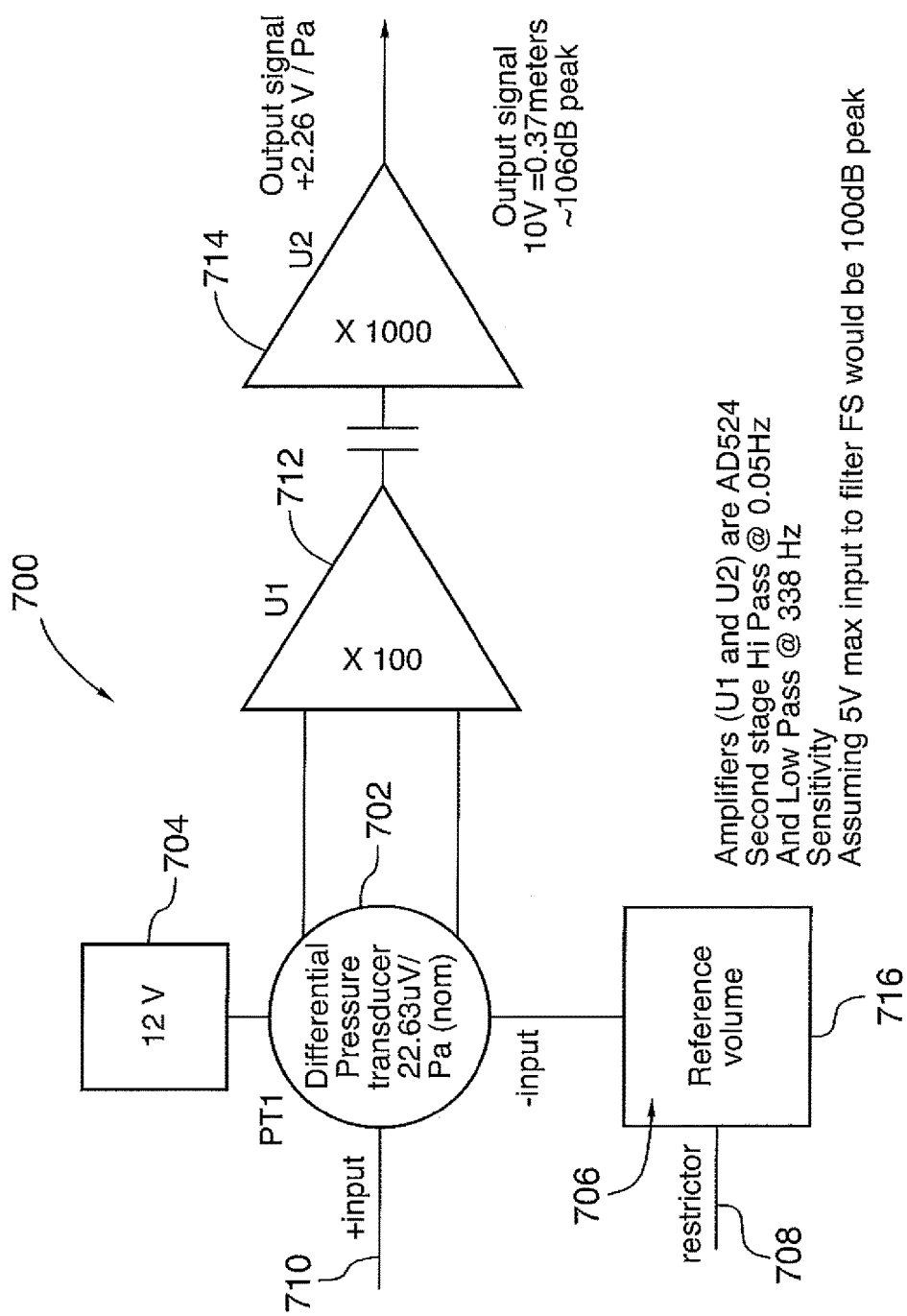
FIG. 7 illustrates a detailed block diagram of a pressure sensor unit, of the system of FIG. 1, in accordance with an example embodiment.

FIG. 7 illustrates a detailed block diagram of a pressure sensor 700, in accordance with an example embodiment, which can be illustrative of one or both of the pressure sensors 108, 110 shown in FIGS. 1 and 2. The pressure sensor 700 includes a differential pressure transducer 702 for detecting pressure changes and providing a signal indicative thereof. The differential pressure transducer 702 is biased by a reference voltage 704 (12 V in this example) and an aluminum casing 716 defining a reference volume 706 having an associated reference pressure. The reference volume 706 is typically the steady state pressure which is only affected by gradual changes in the ambient. A restrictor 708 is used for equalizing the reference volume 706 to the surrounding ambient, steady state or average ambient pressure. The differential pressure transducer 702 receives air input 710 from surrounding air and provides a voltage signal in proportion to the pressure changes or oscillations of the air input 710 with respect to the reference volume 706. This voltage signal therefore is representative of the detected pressure information, being the delta in pressure from the reference volume 706. A first amplifier 712 and second amplifier 714 provide gains to the voltage signal from the differential pressure transducer 702. By way of example only, the output signal from the second amplifier 714 can be +2.26 Volts per Pascal (V/Pa), from the reference volume 706. In some example embodiments, some of the functions of the pressure sensor 700 can be performed by the at least one controller 112. For example, in an alternate embodiment the at least one controller 112 may be used to determine the steady state reference pressure using an average or moving average, etc. This can be determined using raw pressure data detected from the pressure sensor 700, which may not require the reference pressure.

The at least one controller 112 of the system 100 will now be described in greater detail, with reference to FIG. 5 which illustrates a detailed block diagram of an exterior or equivalent pressure sensor signal conditioning system 500 for the pressure sensor information from the exterior pressure sensor 108, and FIG. 6 which illustrates a detailed block diagram of an interior pressure sensor signal conditioning system 600 for the pressure sensor information from the interior pressure sensor 110, in accordance with an example embodiment.

Generally, the at least one controller 112 includes electronic signal filtering of harmonics of the pressure sensors 108, 110, in conjunction with phase shift control, to provide a calculated coil current 124 (FIG. 2) with appropriate current magnitudes and frequencies, to control the air density within the interior 104, thus controlling the pressure within the interior 104 at a relatively constant value as a function of time, thus substantially suppressing undesired pressure oscillations.

The filtering of the pressure information from the pressure sensors 108, 110 can generally be configured with two sets of effectively parallel electronically tunable band-pass filters 132, 134. The number of filters for each set of filters 132, 134 can be equal to a specified number of significant harmonic components in the infrasound signals entering the interior 104 from the source of disruption, from the exterior 106. The trade-off for considering more harmonics is the additional amount of filters and/or processing required. In the examples shown in FIGS. 5 and 6, for example five harmonics are considered, with the first set of band-pass filters 132 having five filters including the fundamental harmonic and the second to fifth order harmonics. The example shown also has the second set of band-pass filters 134 having five filters, for the same order of harmonics.

Figure 5:
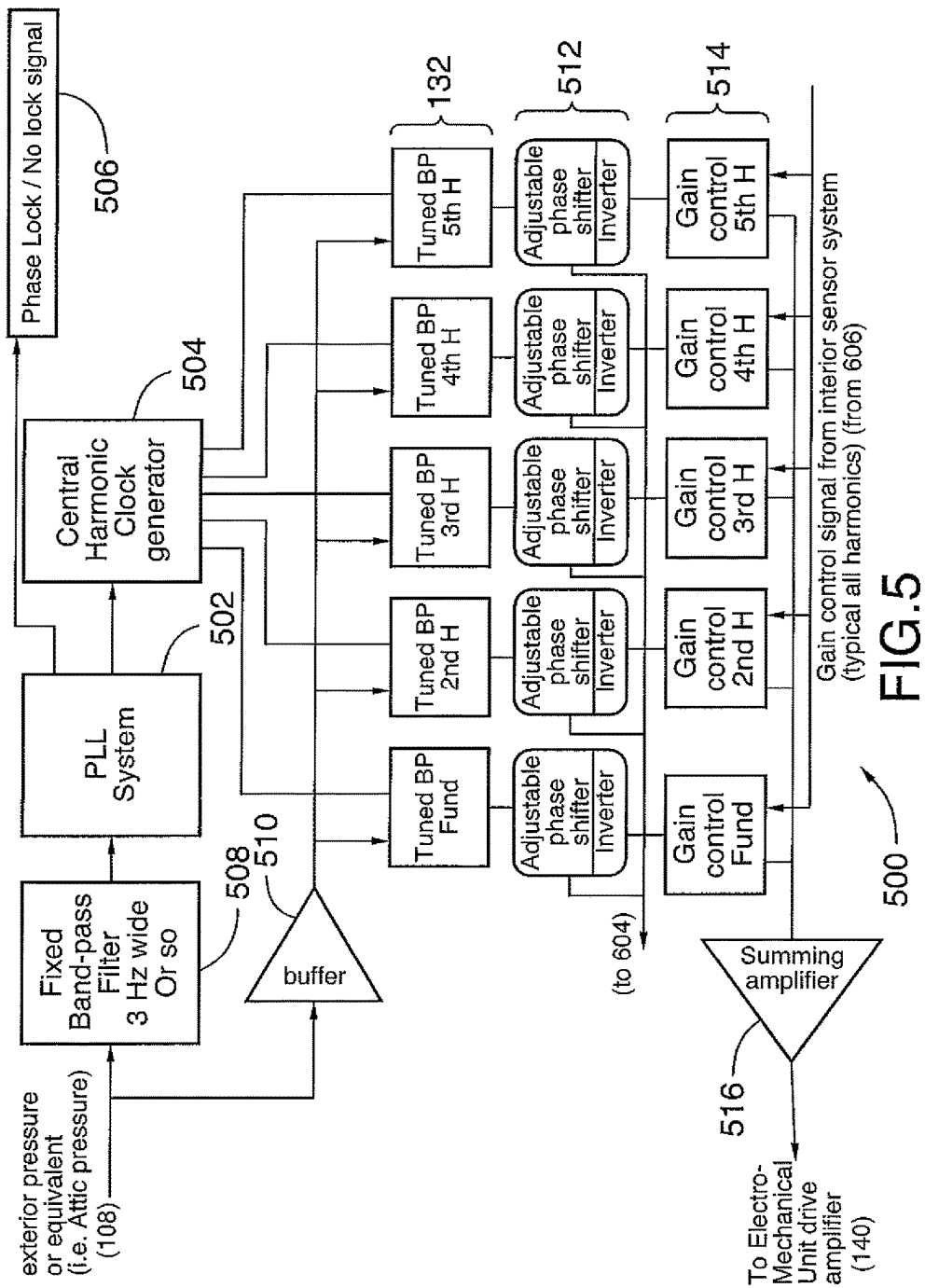
FIG. 5 illustrates a detailed block diagram of an exterior or equivalent pressure sensor signal conditioning system, of the system of FIG. 1, in accordance with an example embodiment.

Referring now to FIG. 5, the pressure sensor information from the exterior pressure sensor 108 is processed by the band-pass filters 132. For example, this provides a reference pressure signal indicative of the exterior 106 (FIG. 2). In some example embodiments, the exterior pressure sensor 108 may be in a volume which is effectively isolated from the control area interior 106 such as a dwelling attic or an external or separate building or room, anywhere indicative of the pressure of the exterior opening interface 122, or simply the outside ambient environment which is also subject to the externally sourced nuisance infrasound.

Figure 6:
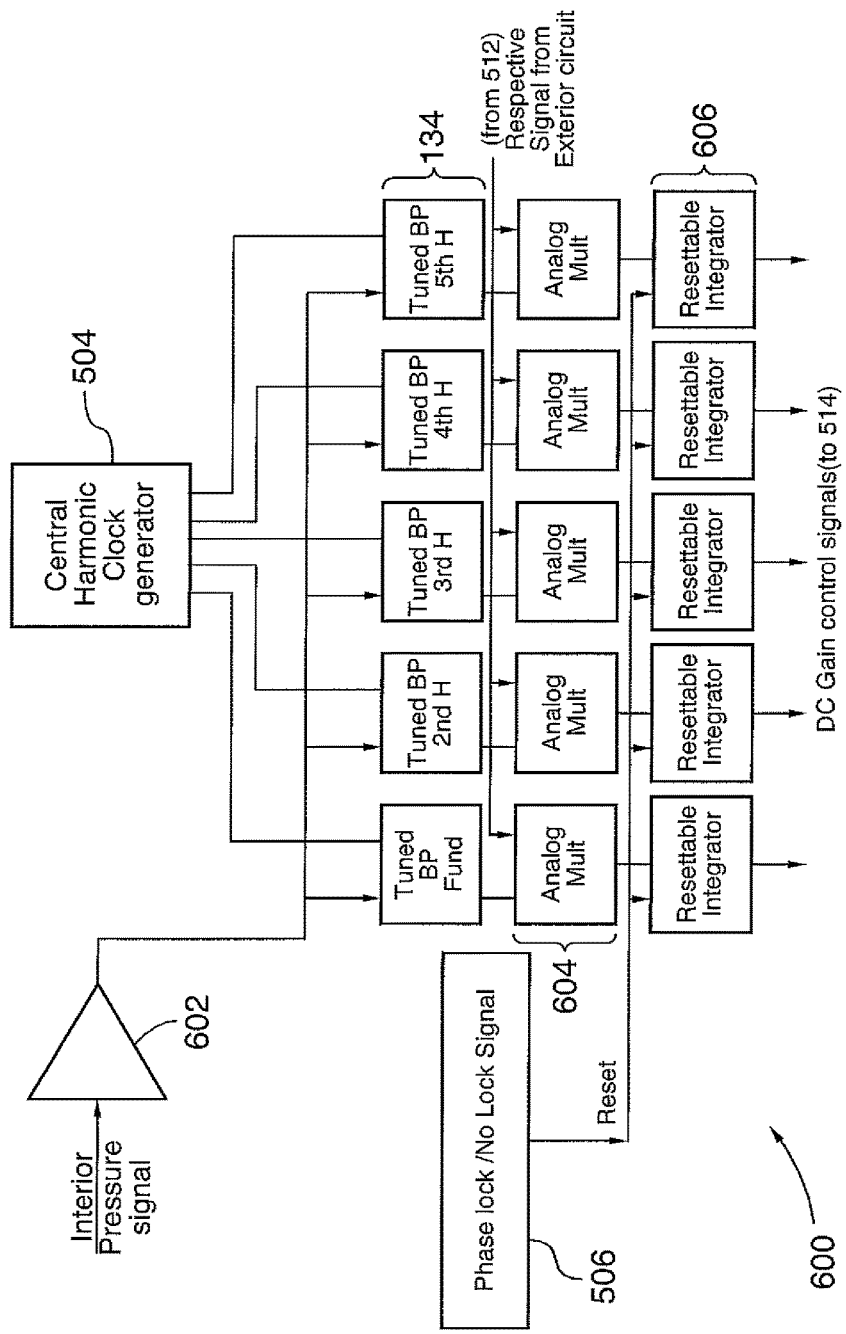
FIG. 6 illustrates a detailed block diagram of an interior pressure sensor signal conditioning system, of the system of FIG. 1, in accordance with an example embodiment.

Referring now to FIG. 6, the second set of band-pass filters 134 is fed pressure sensor information from the interior pressure sensor 110, which can be located within the control area interior 106 where maximum suppression of the infrasound is desired, anywhere indicative of the pressure at the interior opening interface 120, or an area indicative of the interior 106, such as part of or located next to a thermostat or barometer. Both sets of band-pass filters 132, 134 can be essentially identical, and may be set up such that they are configured to pass the fundamental infrasound frequency causing the problem, and each of both the odd and even harmonies related to the fundamental frequency.

Referring again to FIG. 5, a Phase Locked Loop system (PLL) 502 is fed the pressure sensor information from the exterior pressure sensor 108. Once the PLL 502 locks onto at least one or all of the harmonics, a signal can be sent to indicate a phase lock 506. In other example embodiments, instead of signal, a flag, alerts, indicator, etc., can be used. Signal information from the PLL 502 is used by a central harmonic clock generator 504 to generate a series of harmonically related clock signals, which control the band-pass frequencies of both sets of filters 132, 134, by locking onto at least one of the harmonics of the nuisance source frequency arriving at the structure 102. In some example embodiments, an additional fixed frequency band-pass filter 508 may be used as a part of the PLL 502, to limit the frequency band that may be applied to the system input to the PLL 502. In some example embodiments, a search feature is incorporated into the PLL 502, which causes a Voltage Controlled Oscillator (VCO) of the PLL 502 to sweep over a wider range than the nominal capture range of the PLL 502, to ensure that the PLL 502 locks into an appropriate nuisance signal, the frequency of which may be variable at various times (e.g. wind turbines and other machine often vary in operating frequency).

Referring again to block 506, a "Locked In" signal is generated by the PLL 502, which inhibits the search function controlling the VCO and acts as a reset when no signal is locked, e.g. controls the state of integrators 606 circuitry of the system 600 (FIG. 6). A loss of lock signal (e.g. not locked in) is significantly delayed following the loss of a nuisance signal, such that normal interruptions of the nuisance infrasound/noise signal do not immediately result in any changes to the integrator function (the complete function will become clear as the full description is understood). Loss of lock, or a loss of lock that exceeds a pre-determined period of time, results in the "locked in" signal being reset, which results in a reset signal being sent to the integrators 606, and the search function related to the VCO sweep circuit is re-initialized to re-search out a nuisance signal.

The exterior (reference) pressure sensor information signals can pass through a buffer 510 which are then band-pass filtered by the band-pass filters 132, and are therefore separated into the individual Fourier components by the band-pass filters 132. The filtered signals for each order of harmonic are fed into individual phase shift controllers 512 and/or inverters (as appropriate). Individual gain controllers 514 for each harmonic are used to apply a gain element to each harmonic of the received signals, which are provided to a summing amplifier 516, where the signal conditioned Fourier components are re-combined into a composite signal. The composite signal is fed to the power amplifier/coil driver 140 to cancel the pressure oscillations within the interior 104, representative of the one or more harmonic frequencies. The phase shift controllers 512 compensate each Fourier component to shift the phase(s) (remove phase differences) of the exterior pressure sensor 108 to match the pressure signal of the interior pressure sensor 110, as some amount of phase lag between the exterior signal and the interior signal is expected.

Referring to FIG. 6, the interior pressure sensor information signals can pass through a buffer 602 which are then band-pass filtered by the band-pass filters 134, and are therefore separated into the individual Fourier components by the band-pass filters 134. The band-pass filters 134 can be clocked or controlled by the same harmonic clock generator 504 as the exterior system 500. The individual order of harmonic signals are then sent to a respective multiplier 604, which can be an analog multiplier, which are multiplied by the same respective order harmonic signals of the phase-shifted exterior pressure signal information from the phase shift controllers 512 (FIG. 5). The multipliers 604 generate the product of the phase corrected external (reference) signal and the inside (controlled area) signal, for each order of harmonic.

The multiplied signals for each respective Fourier component (order of harmonic) are sent to respective integrators 606. The output from the integrators 606 are used to control the gain-controllers 514 (FIG. 5). This configuration results in a DC voltage from the analog multipliers output (i.e. similar to synchronous detection or synchronous rectification), which has a magnitude proportional to the product of the exterior reference (outside) amplitude of a given Fourier component times the interior (inside) corresponding Fourier component. The integrators 606 integrates this value over time causing the gain-controllers 514 to adjust the magnitude of that Fourier component in the composite signal from the summing amplifier 516, until the multiplier product approaches zero. The interior sensed pressure signal from the interior pressure sensor 110 is thus minimized to an effectively zero amplitude over a period of time determined by the integrator time function. If the exterior pressure signal from the exterior pressure sensor 108 (e.g. the source of the interior pressure disruption) should diminish, the interior signal will also diminish, maintaining the state of the integrators 606 at the same condition (i.e. no change in gain due to changes in nuisance source amplitude). This will maintain the state of the integrators 606 at the ready if the source amplitude recovers within a specified time delay period. For example, there may be periodic variation in source amplitude as a result of multiple sources of very similar amplitudes and frequency of infrasound arriving at the single location, from several wind turbines e.g. a beat frequency phenomenon.

The combined functioning of the integrator 606, gain controller 514 in conjunction with the analog multipliers 604 and interior/exterior sensors 108, 110 is to effectively determine a transfer function between the exterior infrasound source and the interior infrasound reception, such that the inverse of the exterior signal as it appears in the interior can be applied to the interior of the structure 102 to substantially cancel out the related interior infrasound magnitude.

Figure 8:
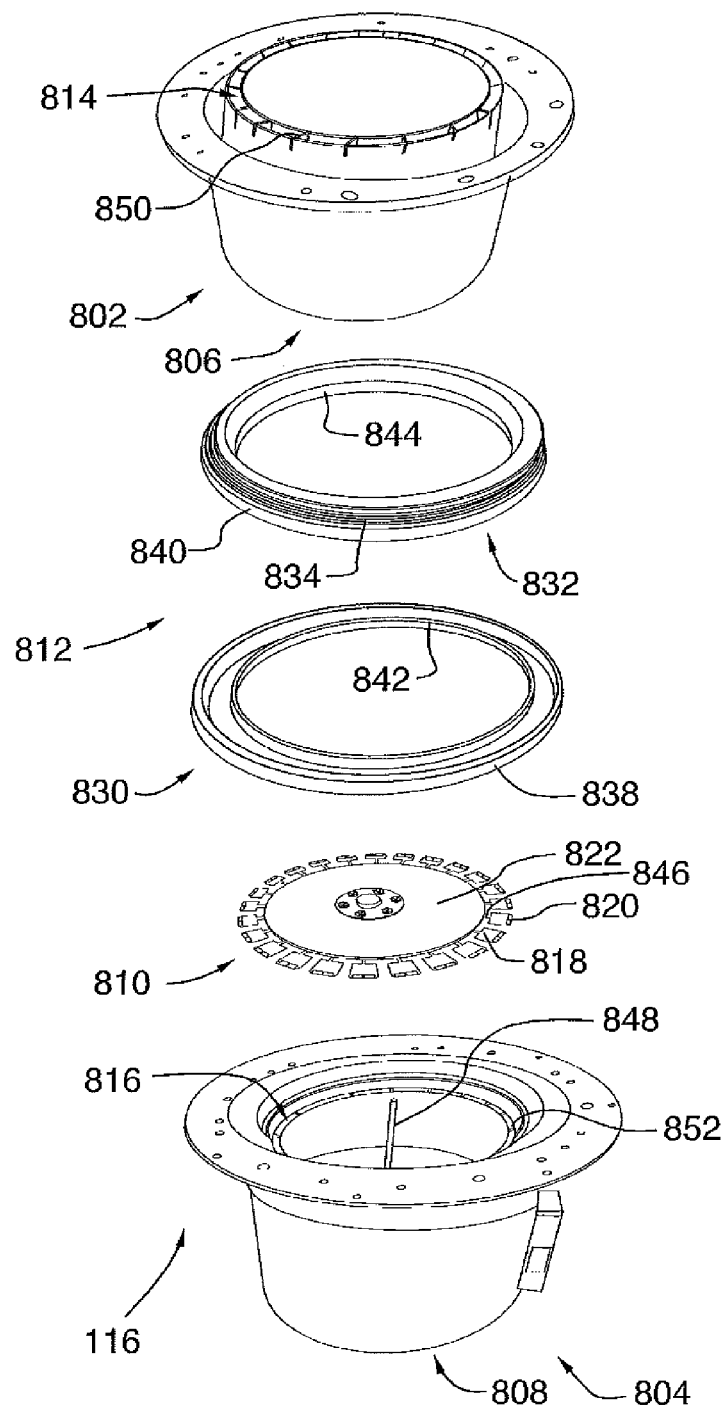
FIG. 8 illustrates an exploded view of an infrasound generating compressor to be used in the system of FIG. 1, in accordance with an example embodiment.

Reference is now made to FIGS. 8 to 15, which illustrate an example embodiment of the reversible compressor 116, and illustrates in detail the electro-mechanical components thereof. Reference is first made to FIG. 8, which illustrates an exploded view of the compressor 116, which can for example be an axial compressor. The compressor 116 can, for example, be installed or retrofit in between the exterior 106 and the interior 104 of the structure 102 (FIG. 2), to create pressure flows between the exterior 106 and the interior 104 and controlled in the manner as described herein. For example, the compressor 116 can be installed or retrofit similar to that of a window air conditioning unit (not shown).

In the example embodiment shown in FIG. 8, the compressor 116 includes an exterior housing 802 and an interior housing 804 which collectively form the main housing 118 of the compressor 116, and which can be connected together. A rotor 810 is positioned between the exterior housing 802 and the interior housing 804, which can be held in place by a central drive shaft 848. The drive shaft 848 is typically driven at a relatively high RPM, for example to hundreds or thousands of RPM, and can be controlled by the at least one controller 112 or by a separate power source, for example. The drive shaft 848 can be drive at a constant speed, in an example embodiment. An electromagnet 812 in the form of a toroid assembly with coil circumferentially surrounds the rotor 810, while the interior housing 804 circumferentially surrounds the electromagnet 812.

Figure 9:
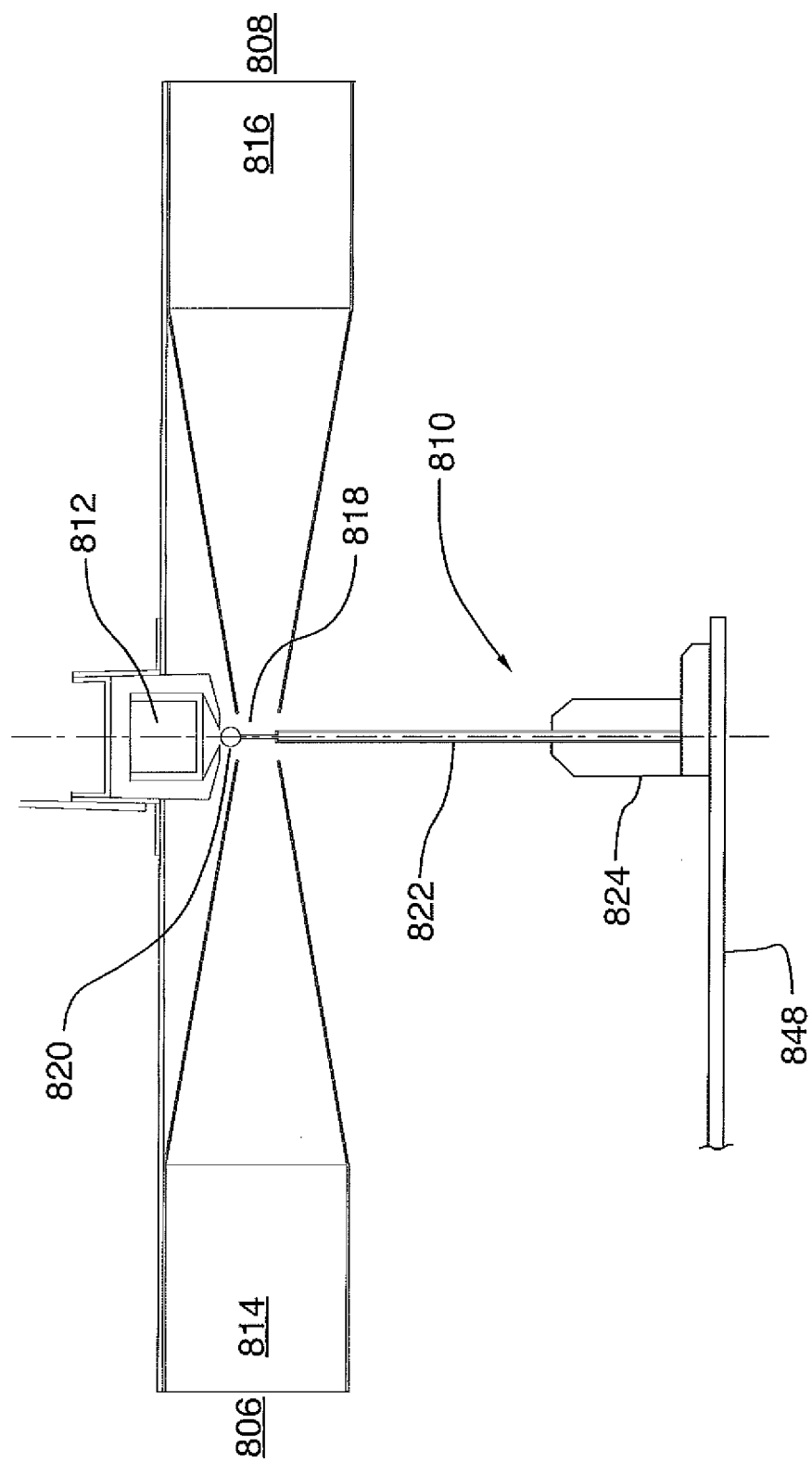
FIG. 9 illustrates in diagrammatic form a partial top-half cross-section of the assembled infrasound generating compressor of FIG. 8, the remaining partial bottom-half cross-section being substantially a mirror image thereof (not shown here)

In some example embodiments, the exterior housing 802 defines an opening interface 806 which is open to the exterior 106 through a respective flow passage(s) 814, while the interior housing 804 defines an opening interface 808 which is open to the interior 104 through a respective flow passage(s) 816. As shown in FIG. 9, the flow passages 814, 816 can be tapered towards the rotor 810.

As shown in FIG. 8, the rotor 810 includes a compressor disc 822 and a plurality of blades 818 which radially extend from respective blade stems 846 which are mounted to the compressor disc 822. In an example embodiment, the compressor disc 822 is driven by a driver motor 824 (FIG. 9), for example, at a relatively constant speed. In another example embodiment, not shown, the speed of the drive motor 824 is yet another variable to be controlled, at variable speed, as part of the overall variable control loop by the one or more controllers 112.

In an example embodiment, the blades 818 are generally positioned between the two flow passages 814, 816, to generate airflows in a controlled manner there through, for example to create input or output flows between the exterior 106 and the interior 104. In an example embodiment, the blades 818 are magnetic, for example each blade 818 can have a respective magnet 820 at the respective end. In other example embodiments, not shown, the blades 818 themselves are at least partly formed of magnetic material.

In an example embodiment, in a normal or resting state, each blade 818 can be blade shaped or flat and be oriented perpendicular to that of the flow passages 814, 816, which can be considered zero degrees as a reference angle. In other words, the blades 818 are parallel to the direction of rotation of the rotor 810. In this state, no air flow (other than incidental) should occur as a result of rotating of the compressor disc 822. In an example embodiment, the plurality of blades 818 are formed of resilient material to act as a torsion spring, to twist in a range of positive and negative blade angles to generate respective positive and negative airflows between the exterior opening interface 806 and the interior opening interface 808, in combination with the relatively constant rotation of the compression disc 822. In other example embodiments, the blades 818 can be curved, double s-shaped, or other suitable blade shapes. This amount of twisting of the blades 818 is variable controlled by the electromagnet 812, which results in generation of pressure oscillations, described in detail next.

Referring still to FIG. 8, the electromagnet 812 is shown as first toroid half 830 and second toroid half 832 which circumferentially surrounds the rotor 810. The second toroid half 832 can include a coil winding 834. Each of the halves 830, 832 can be formed of solid mild steel, for example with powdered iron pole pieces. The toroid halves 830, 832 contact each other on the respective outside diameter 838, 840, but the pole pieces do not contact each other on the inside diameters 842, 844. A magnetic field is generated by the coil winding 834 across the gap (in an axial direction) defined by the inside diameters 842, 844 in a typically semi circular magnetic flux pattern. A driver 140 (FIG. 2) is configured to provide positive or negative current to the coil winding 834. For example, referring to FIG. 2, the power amplifier/coil driver 140 provides the coil current 124 in a controlled manner at one or more frequencies. The inside diameters 842, 844 of the toroid halves 830, 832 therefore define opposite magnetic poles as a result of the coil current 124.

Figure 10:
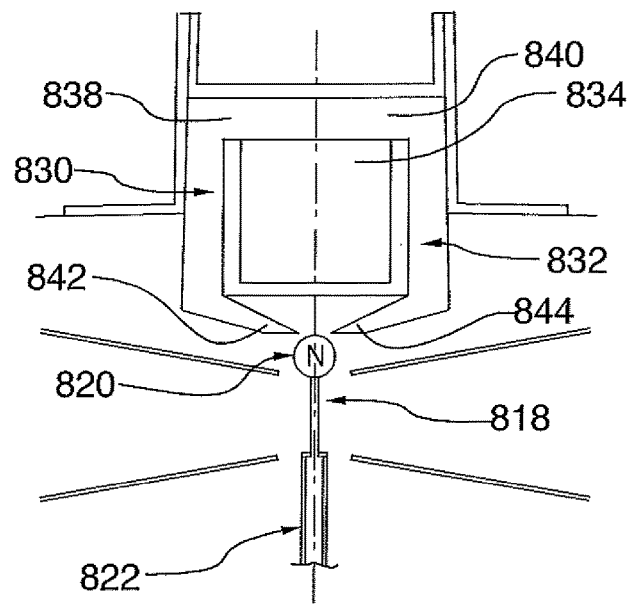
FIG. 10 illustrates in diagrammatic form a detailed view of FIG. 9.
Figure 11:
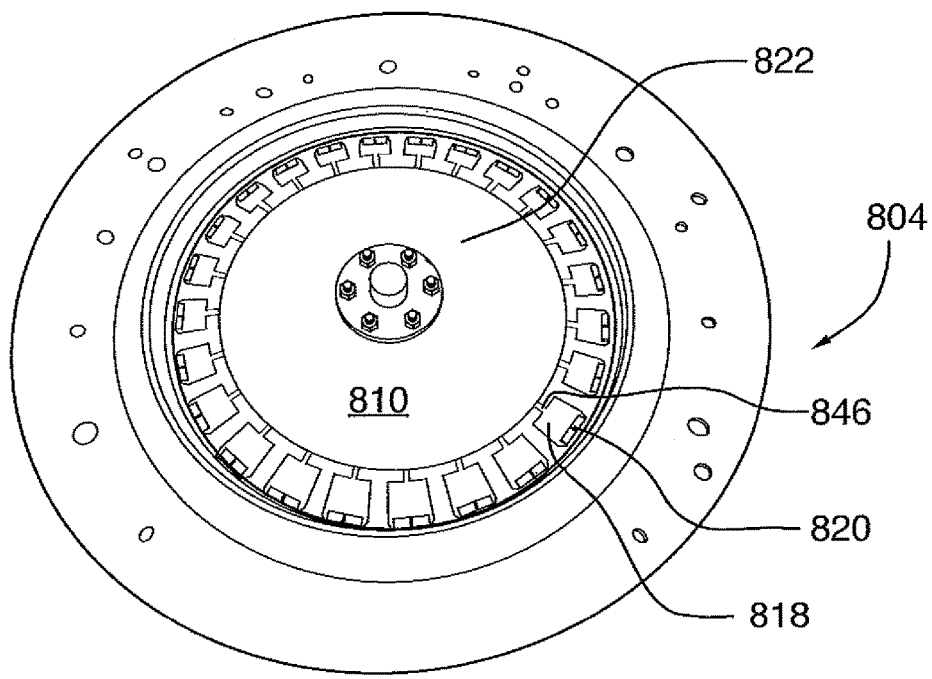
FIG. 11 illustrates an axial view of the assembled infrasound generating compressor of FIG. 8.

Reference is now made to FIGS. 9 and 10, which illustrates in detail how the electromagnet 812 influences the blades 818. The magnets 820 of the blades 818 run very close to the continuous poles all the way round the inside diameter 842, 844 of the toroid as the rotor 810 rotates. The magnets 820 are positioned to be magnetically influenced by both poles and depending on which pole is north and which pole is south, causes the blade 818 to twist or torque in one direction or the other, and the torque is dependent on the amount of coil current 124 applied by the power amplifier/coil driver 140. Accordingly, the blade angle of the blade 818 is controlled by the coil current, and provides a corresponding positive or negative airflow through the flow passages 814, 816 (FIG. 8). In an example embodiment, all blade mounted magnets 820 are oriented in the same north south direction during assembly, so that a same direction of flow is provided by each blade 818 and respective blade angle. Note that the electromagnet 812 does not deliver any rotational torque to the rotor 810, rather, that drive can come from a separate drive motor 824 (FIG. 9) via the central drive shaft 848, typically at a constant speed. As well, the positive and negative flows are readily performed by controlling the coil current 124, which does not require having to reverse the spinning momentum of the direction of the drive shaft 848, for example.

Figure 12:
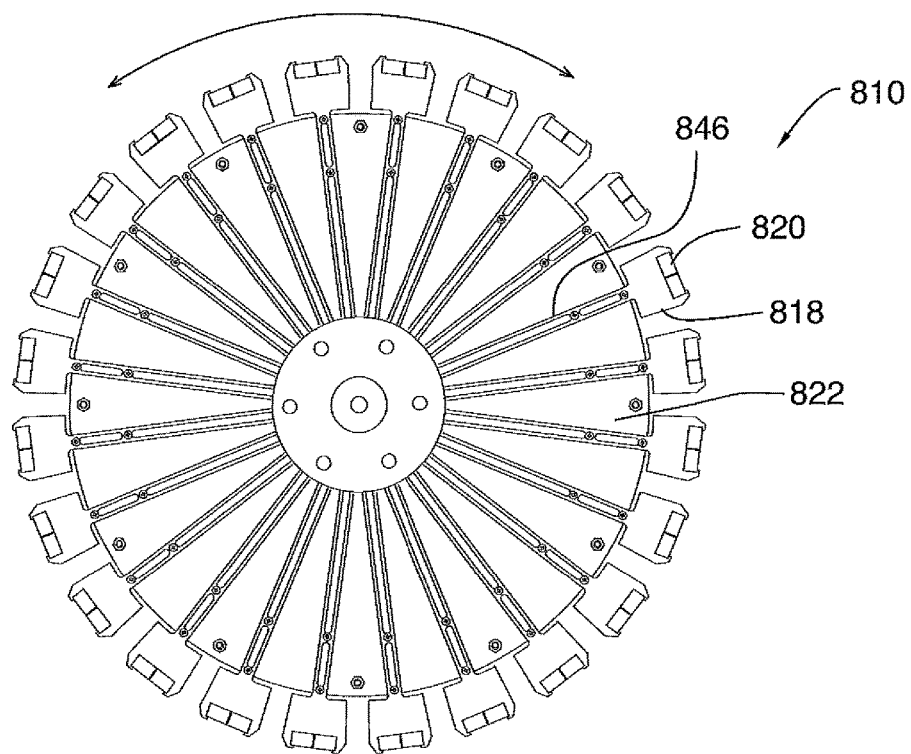
FIG. 12 illustrates an axial view of a compressor rotor for the infrasound generating compressor of FIG. 8, in accordance with an example embodiment.

As best shown in FIG. 12, the compressor disc 822 can be formed of a disc of thin material, and cut, formed or mounted with components in such a way as to form the blades 818. In some example embodiments, the rotor 810 can also be manufactured from non-metallic materials such as plastic, as a single injection molded component with magnets either incorporated during the molding process or added separately later. In some other example embodiments, carbon fiber may also be used as some or all of the material for the blades 818, for resiliency and long term durability.

Referring again to FIG. 10, when the control current 124 in the coil 834 is at zero amps, the magnetic attraction of both poles of the spinning permanent magnets 820 mounted on the blades 818 are equal to each of the poles of the inside diameters 842, 844, thus zero torque is applied to each of the blades 818, and all of the blades 818 remain in a neutral position or zero degrees.

As the DC current in the coil 834 is increased, the poles defined by the inside diameters 842, 844 become more and more magnetized in a given polarity, North or South. This action causes the end poles of the permanent magnets 820 to become attracted to the opposite magnetic pole defined by the inside diameters 842, 844, resulting in a twisting torque being applied to each of the rotating blades 818 of the compressor disc 822 causing the blades 818 to twist a certain amount based on the torsion spring balance against the magnetic torque moment.

The degree of twist of each blade 818 is proportional to the magnitude of current in the coil 834. The torsional stiffness of the blade stem 846 (FIG. 12), which can be mounted to the compressor disc 822 (best shown in FIG. 12), provides a torsional spring force against which the magnetic torque reacts, providing a balancing force at a given blade angle as a function of magnetic torque. With a given polarity of current to the coil 834, the blade angle is such that airflow is forced in one direction through the air flow passages 814, 816. All magnets 820 are positioned with the same polarity arrangement on all blades 818, to obtain the same direction of twist in each case. Applying the opposite direction of current flow in the coil 834 reverses the direction of blade twist and as such airflow direction through the air flow passages 814, 816.

By cyclically varying the current in the coil 834, the blade angle of each blade 818 can be cyclically varied at a determined frequency or frequencies which account for higher order harmonics, resulting in the flow and pressures developed by the compressor 116 cyclically varying in proportion to the coil current 124 magnitude and polarity.

The blade 818 control from the coil current 124 results in the barometric pressure in the structure 102 to vary proportionally as the density of air within the dwelling, to vary as a function of time according to the direction and rate of airflow through the compressor 116, which can be used to cancel unwanted pressure oscillations. The amount of control is dependent on the coil current 124 signals provided by the at least one controller 112, with pressure signal information received from the exterior pressure sensor 108 and the interior pressure sensor 110. The pressure signal information are used to control the coil current 124 applied to the coil 834, in such a way as to cancel the pressure within the desired interior 104 as a function of the cyclic barometric pressure frequencies and/or harmonics of interest.

Figure 14:
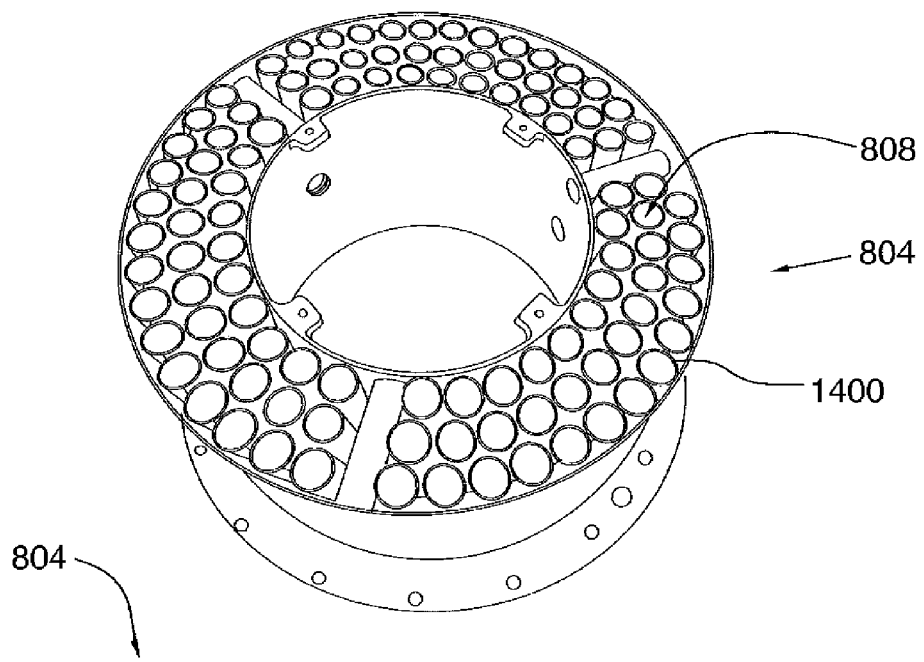
FIG. 14 illustrates an end view of an example housing of the infrasound generating compressor shown in FIG. 8, illustrating spinning mode attenuators, in accordance with an example embodiment.

A noise attenuation feature in accordance with an example embodiment will now be described, with reference now to FIG. 14. FIG. 14 shows in detail an example of the interior opening interface 808 side of the interior housing 804. A similar arrangement can be included in the exterior housing 802, but is typically not required as the noise can typically dissipate into the ambient of the exterior 106.

A plurality of tubes 1400 can be provided on the interior opening interface 808 side. Each tube 1400 can be e.g. on or about 0.017 meters in diameter, and on or about 0.075 meters depth. The shape of the tubes 1400 attenuate spinning modes up to about 10 kilohertz, but will allow plane waves and air flow to pass through. This is used to block the propagation of spinning modes from the rotor 810 into the interior space, for example. This is used to minimize potential blade passing noise from the compressor 116, which would propagate out from the interior opening interface 808 into the interior 104 of the structure 102. In practice, the fundamental blade passing frequency has been found to only be about 650 Hz, but additional harmonics can be generated by the stator vane interaction. This feature can allow the compressor 116 to be driven via the drive motor 824 (FIG. 9), at higher speeds without an increase in the interaction noise. In other example embodiments, not shown, other configurations and shapes can be used, such as hexagonal tubes, and/or such as in a honeycomb configuration, for example.

Figure 15:
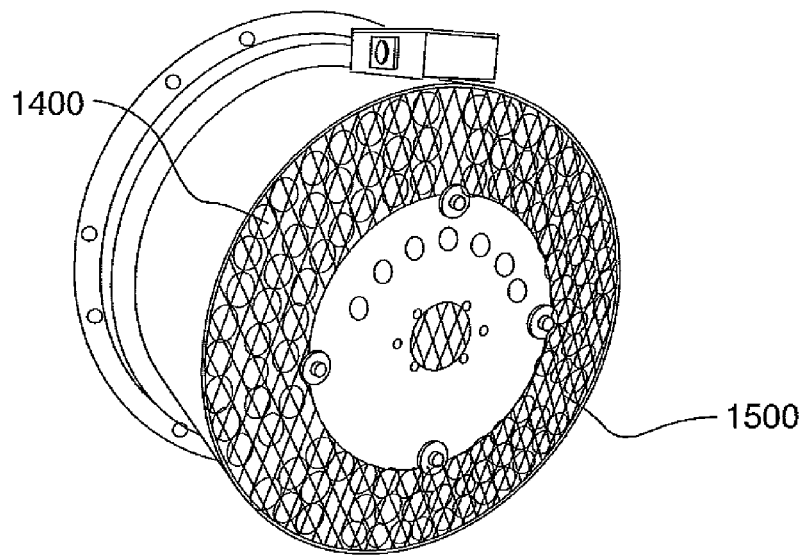
FIG. 15 illustrates an end view of the example housing of FIG. 14, installed with a screen.

Referring now to FIG. 15, the interior housing 804 and the tubes 1400 can be covered by a screen 1500, which permits airflow but filters and prevents foreign objects from entering the interior opening interface 808. A similar type of screen (not shown) can be mounted to the exterior housing 802.

Referring again to FIG. 8, in an example embodiment, a plurality of housing mounted stator vanes 850 of the exterior housing 802 can further define the air flow passage 814. Similarly, a plurality of housing mounted stator vanes 852 of the interior housing 804 can further define the air flow passage 816. In an example embodiment, the stator vanes 850, 852 are about one inch in depth. In an example embodiment, the stator vanes 850, 852 are stationary or static. These stator vanes 850, 852 can assist in redirection or collimation of the airflows through the air flow passages 814, 816. These stator vanes 850, 852 can be at a fixed parallel angle or at a biased angle, for example.

Figure 17:
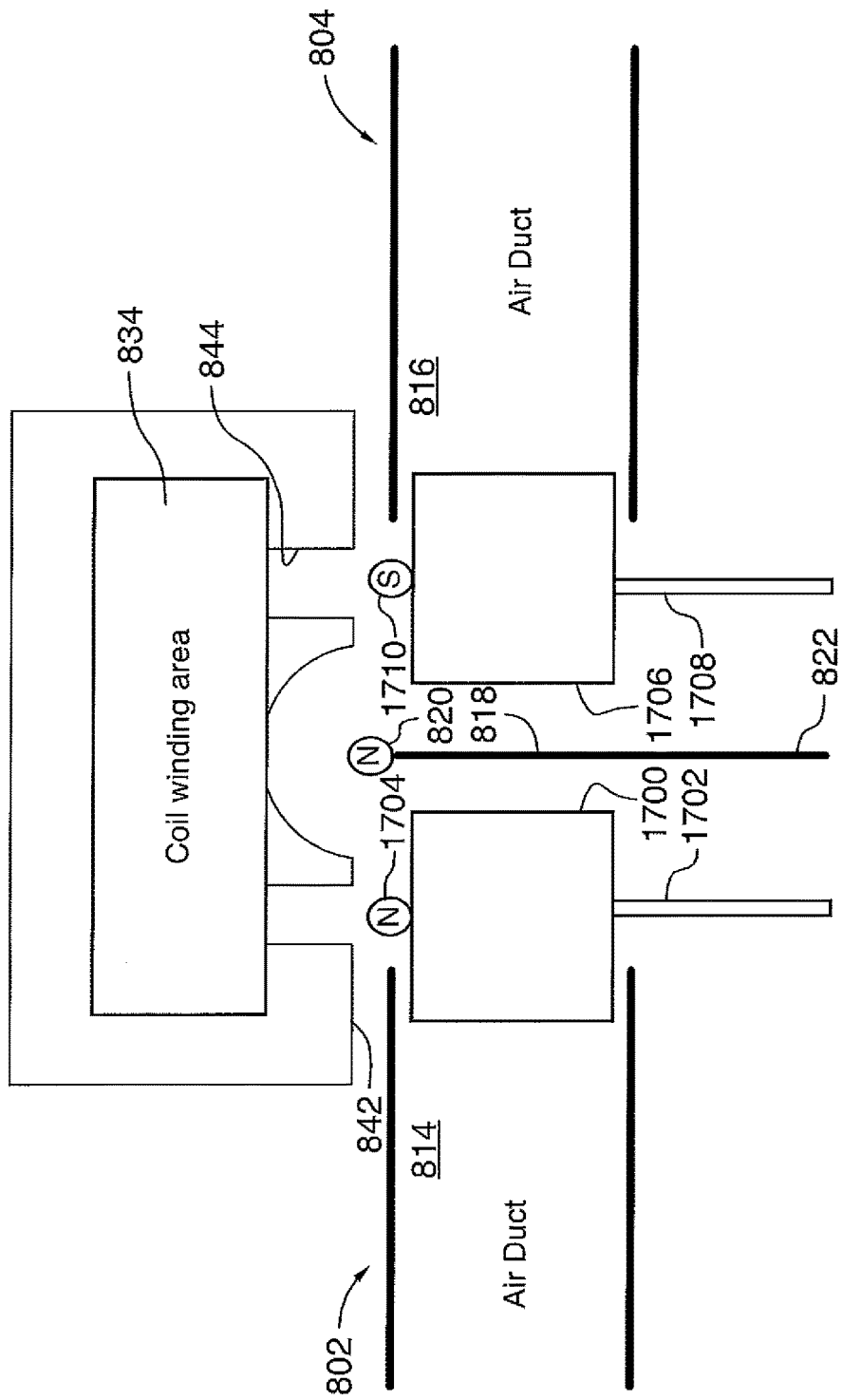
FIG. 17 illustrates in diagrammatic form another example infrasound generating compressor with a similar view as FIG. 9, in accordance with another example embodiment.

Another example embodiment of housing mounted stator vanes 1700, 1702 is illustrated in FIG. 17, in accordance with an alternate example embodiment. Similar reference numbers are used where appropriate for convenience of reference. The example embodiment shown in FIG. 17 includes, at the exterior housing 802 side, a plurality of radially extending non-rotating housing mounted stator vanes 1700 (one shown in this view), a respective vane stem 1702, and a respective magnet 1704 mounted at the end of each vane 1700. At the interior housing 804 side, there may also be a second plurality of radially extending non-rotating housing mounted stator vanes 1706 (one shown in this view), a respective vane stem 1708, and a respective magnet 1710 mounted at the end of each vane 1706.

As shown in FIG. 17, when the control current 124 in the coil 834 is at zero amps, the magnetic attraction of both poles of the spinning permanent magnets 820 mounted on the rotating blades 818 are equal to each of the poles of the inside diameters 842, 844, thus zero torque is applied to each of the blades 818, and all of the blades remain in a neutral position or zero degrees. The same is true for the non-rotating variable stator vanes 1700, 1706 and their respective magnets 1704, 1706.

As the DC current in the coil 834 is increased, the magnetic poles defined by the inside diameters 842, 844 become more and more magnetized in a given polarity, North or South. This action causes the end poles of the permanent magnets 820 to become attracted to the opposite magnetic pole defined by the inside diameters 842, 844, resulting in a twisting torque being applied to each of the rotating blades 818 of the compressor disc 822 causing the blades 818 to twist a certain amount based on the torsion spring balance against the magnetic torque moment. As well, the same resultant magnetic field causes a twisting torque being applied to each of the stator vanes 1700, 1706 to twist a certain amount based on the torsion spring balance against the magnetic torque moment.

The degree of twist of each blade 818 is proportional to the magnitude of current in the coil 834. With a given polarity of current to the coil 834, the blade angle is such that airflow is forced in one direction through the air flow passages 814, 816 (all magnets are positioned with the same polarity arrangement on all blades 818), and with appropriate magnetic direction of the magnets 1704, 1710 on the stator vanes 1700, 1706, to obtain the appropriate direction of twist in each case. Applying the opposite direction of current flow in the coil 834 reverses the direction of blade or vane twist and as such airflow direction through the air flow passages 814, 816.

In an alternate example embodiment, not shown, the stator vanes 1700, 1706 are pivotally or hingedly mounted to the respective housing 802, 804. Operation of the coil 834 results in rotation of the stator vanes 1700, 1706 about a pivot point, to affect airflow in combination with the main rotating blades 818. The stator vanes 1700, 1706 can be formed of rigid or resilient material in some example embodiments. The stator vanes 1700, 1706 can be flat or curved in some example embodiments.

Figure 13:
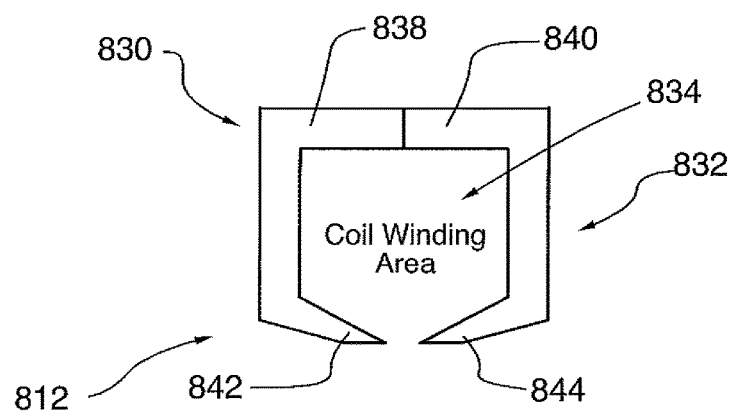
FIG. 13 illustrates in diagrammatic form a partial detail cross-section of an example toroid electromagnetic structure, in accordance with an example embodiment.
Figure 16:
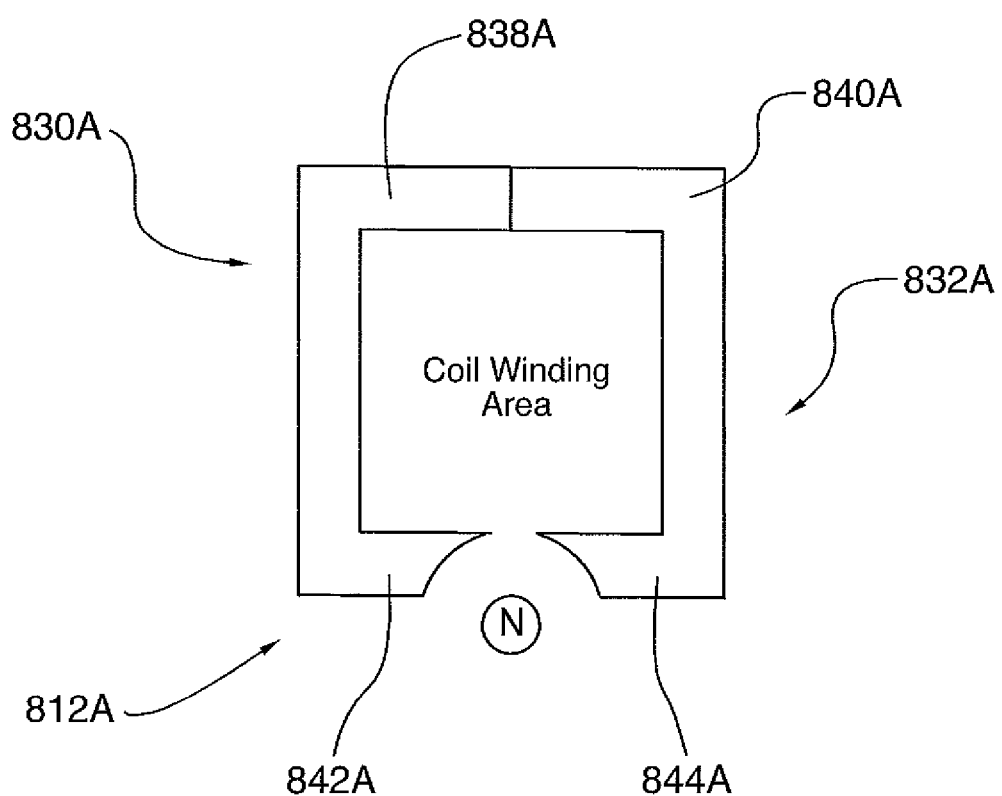
FIG. 16 illustrates in diagrammatic form another example toroid electromagnetic structure with a similar view as FIG. 13, in accordance with another example embodiment.

FIG. 16 illustrates another example toroid coil of an electromagnet 812A with a similar view as FIG. 13, in accordance with another example embodiment. This electromagnet 812A can be used instead of the above-described electromagnet 812, for example. The electromagnet 812A is shown as first toroid half 830A and second toroid half 832A for circumferentially surrounding the rotor 810. A coil winding 834A surrounds the toroid halves. The toroid halves 830A, 832A contact each other on the respective outside diameter 838A, 840A, but the poles do not contact each other on the inside diameters 842A, 844A. The inside diameters 842A, 844A are of a different shape which terminate at a point which is more radially outward, which generates a different shape of the magnetic field, as well as providing additional clearance for the blades 818, for example.

In some example embodiments, infrasound can be considered pressure changes that are at least lower in frequency than 20 Hertz or cycles per second, for example. In some example embodiments, the system 100 is able to handle frequencies which are higher or lower depending on the frequency of the original source of the pressure disturbance.

Variations may be made in some example embodiments. In some example embodiments, the described systems can be manufactured, installed, applied or retrofit to any structure, premises, or vehicle where there is infrasound or periodic variance in pressure. For example, a boat or ship which is travelling can result in pressure variances within any of the structures or rooms from the rise and fall from the waters. An air vehicle such as an airplane or helicopter may experience pressure variances within the housing frame from external natural or artificial sources and/or its own propellers.

Motion sickness can occur in a moving vehicle. For example, in McCauley et al., it was believed the predominant cause of motion sickness to be primarily from movement frequency and acceleration. For example, it has been traditionally thought that vestibular-ocular functions (inner-ear and eye co-ordination) may be disrupted based primarily on acceleration changes, such as in the vehicle. However, merely addressing these variables may be insufficient in addressing the affliction to the passenger.

In some example embodiments, there is provided systems and methods for controlling a source of physiological affliction within a moving enclosed structure, such as a vehicle. The system includes: at least one pressure fluctuation generator, at least one pressure sensor located to sense pressure indicative of the interior of the structure; and at least one controller configured to: determine, from the first pressure sensor information, at least one pressure disturbance within the interior of the structure; and control the at least one pressure fluctuation generator to cancel the at least one pressure disturbance within the interior of the structure. In an example embodiment, the at least one pressure disturbance includes infrasound. In an example embodiment, the physiological affliction includes motion sickness and/or nauseogenicity.

Physiological afflictions can occur when a vehicle is moving. It is recognized herein that pressure fluctuations can be a contributing, and often primary, cause of these physiological afflictions.

An example model for Motion Sickness Incidence (MSI) based on infrasonic pressure will now be described, in accordance with an example embodiment, which can be referred to as a pressure model for MSI. The example model uses at least some of the data points measured by the landmark study of McCauley et al., for example. In particular, cyclic variation in the lateral or linear velocity of a subject in a vehicle or platform in atmospheric air may also be subject to infrasonic pressure fluctuations due to the Bernoulli principle and possibly vortex shedding effects. Calculations presented can demonstrate that in McCauley et al., test subjects were exposed to infrasonic sound pressure levels in excess of 105 db at discrete frequencies between 0.063 Hz and 0.7 Hz. The infrasonic sound pressure level necessarily present in cyclic motion in free atmospheric air does not appear to have been accounted for as a nausea influencing factor in the original McCauley et al. motion sickness studies.

The potential relationship can exist between infrasound and nauseogenicity. However, infrasonic pressure fluctuations were apparently not considered in any of the motion sickness studies of the day, such as in McCauley et al. It can, however, be shown that motion in a free atmosphere will result in pressure fluctuations around the moving bodies and this is particularly well defined for vertical motion, because the Geopotential Pressure, more commonly known as Barometric Pressure, is an inverse function of altitude. The Bernoulli principle, which relates velocity and pressure to motion in a gas or fluid may also result in infrasonic pressures being developed, particularly in the case where vortex shedding or turbulence may be present in linear motion, however, for exemplary purposes the present disclosure calculates infrasound generated as a result of cyclic vertical displacement, in an example embodiment.

Vertical displacement in a cyclic pattern will result in the subject involved in the motion being exposed to a variation in the barometric pressure as an inverse function of the vertical displacement. Motion sickness trials have not taken this potential biodynamic stimulus into account when investigating vertical motion sickness and nausea, but appear to have paid closer attention to other variables, such as the acceleration and frequency effects. In more recent times, infrasound has been implicated in various complaints related to discomfort and sometimes nausea, and have recently been directly compared to motion sickness symptoms.

The data from McCauley et al. is examined and re-modeled in the present disclosure. Data provided by McCauley et al. in the report on test frequencies and acceleration levels have been used to back-calculate the vertical displacements and resulting infrasonic pressures to which the many test subjects were exposed during the investigation into the relationship between acceleration, frequency and Motion Sickness Incidence (MSI). It was a partial aim of the McCauley team to validate and improve a model for MSI that had been partially developed from data generated in previous investigations.

The determination of infrasonic pressure magnitudes can be calculated from the US Standard Atmosphere, (Geopotential Altitude), U.S. Government Printing Office, Washington, D.C., 1976, incorporated herein by reference. Using the information from this reference, the variation in barometric pressure for a change in vertical position of 1000 Feet is 0.53 PSI, or equivalently a change of 304.8 meters will result in a pressure change of 3654.2 Pascal's, which is about 12 Pa/meter. The whole body of a subject undergoing a +/−1 meter vertical displacement at any frequency is essentially being exposed to an infrasonic sound pressure (at the same frequency) of about 8.5 Pascal's RMS. In un-weighted decibel terms this is equal to about 112 dB.

This information can be used for back-calculation of infrasonic pressure for the data from the McCauley et al. study. All of the test point motion generator settings used to develop the McCauley model (which were tabulated in appendix B of McCauley et al.) were used to calculate the vertical displacements the test subjects were exposed to, as a method of establishing the magnitude of infrasonic pressures the motion sickness subjects were exposed to during the testing that simultaneously recorded nausea (actually emesis).

The vertical displacements were calculated by extracting the second integral of acceleration with reference to frequency (1.1).

The test subject displacement is calculated by:

$$D = \frac{a}{\omega^2} \tag{1.1}$$

where: D: is displacement;
a: is acceleration in g's:

$$1.0 \text{ g} = 9.806 \frac{\text{m}}{\text{Sec}^2};$$

ω: is 2πf: f is the frequency of the acceleration in Hz.

Figure 21:
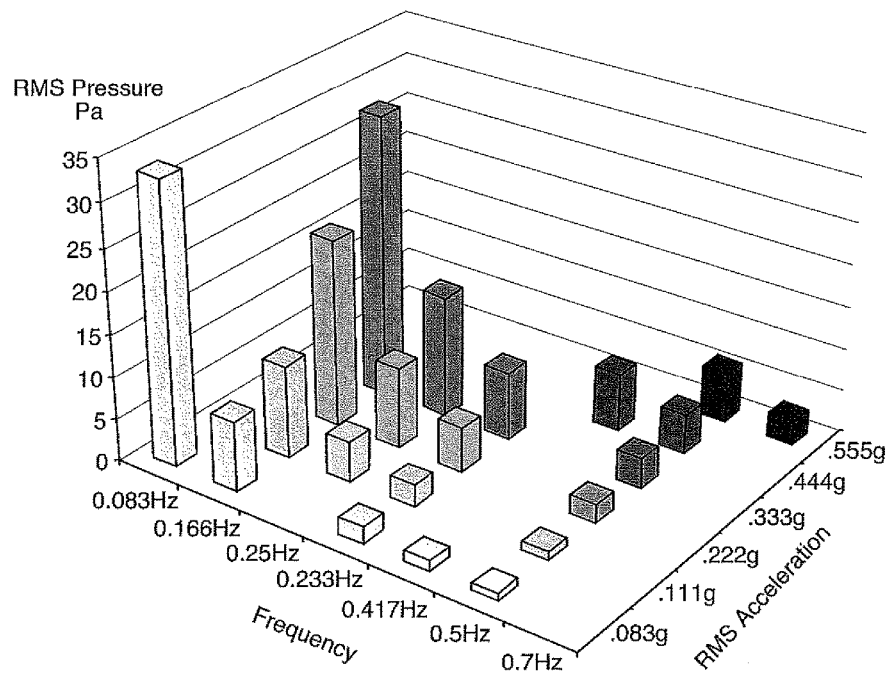
FIG. 21 illustrates a 3D bar graph of back-calculated results of a Motion Sickness Incidence (MSI) pressure model in accordance with an example embodiment, for all data points provided by McCauley et al.

FIG. 21 is a 3D bar graph of the results of the infrasonic pressure calculations for all points provided in McCauley et al., appendix B. FIG. 21 represents the results of back-calculating the vertical displacement and the resulting infrasound pressures (y axis), from the frequency (x axis) and acceleration data (z axis) provided in appendix B of McCauley et al., by applying equation 1.2 which converts cyclic vertical displacement into the resulting infrasonic pressure.

The infrasonic pressure magnitude p is calculated by:

$$p = 11.99 \frac{a}{\omega^2} \tag{1.2}$$

where:
p; is the cyclic pressure change in Pascal's due to a cyclic change in vertical position.

The 0.166 Hz line is of particular interest in the graph of FIG. 21, since it is the highest infrasound pressure at any given acceleration level except for a single point at 0.083 Hz (5 CPM) where a very low subject response was measured.

Figure 22:
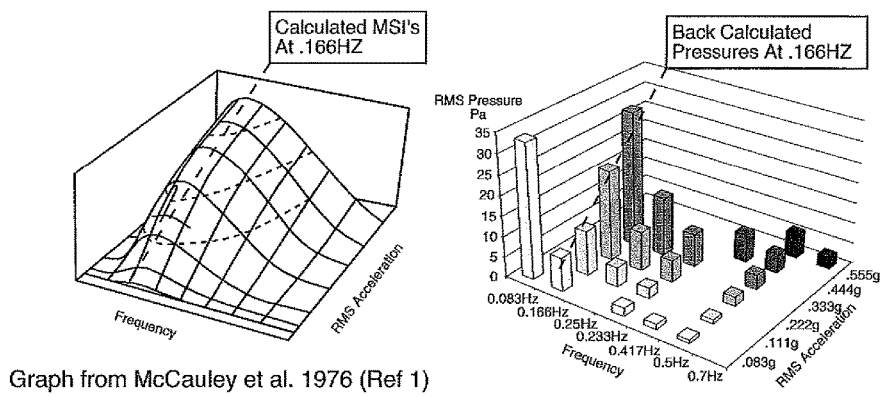
FIG. 22 illustrates a side-by-side comparison between a MSI Model of McCauley et al. on acceleration and frequency (left) and the MSI pressure model in accordance with an example embodiment (right)

Referring now to FIG. 22, a 3D graph of the McCauley model output is shown in comparison to the back-calculated infrasonic pressure values from the various test points used to develop the McCauley model. The McCauley model was developed based on the nauseogenic response of about 2000 test subjects. The 3D graph from McCauley et al. (left image of FIG. 22), shows an exaggerated nauseogenicity at exactly the frequency which would have consistently produced the highest infrasonic pressure values for a given acceleration, based on the motion generator settings used during the study. The McCauley study did show a response at a single point below 0.167 Hz frequency which was a 5% MSI at 0.083 Hz after 115 minutes. The general trend indicated by the McCauley et al. MSI model is clearly present in the infrasound pressure graph of FIG. 21.

As shown in FIG. 22, the comparisons between the McCauley model for MSI based on acceleration and frequency (left), to the back calculated pressures (right), based on the data points used to develop the McCauley model, show that the maximum nauseogenicity at about 0.166 Hz is coincident with the maximum infrasonic pressure levels that the test subjects were exposed to above about 0.09 Hz (5.4 CPM).

The model for MSI based on Infrasonic Pressure alone will now be described in greater detail, in accordance with an example embodiment. The strong similarity (FIG. 22) between the MSI of McCauley et al. and the back-calculated infrasonic pressure data at the most sensitive frequency (0.166 Hz) and the general similarity of the trends at all frequencies between the data sets, prompted a study to evaluate the potential accuracy of a simple model developed here to express MSI as a function of exposure to infrasonic pressure only (no acceleration motion), as given by:

$$MSI = kPf^{\frac{1}{x}}\ln(t) \qquad (2.1)$$

where:
P is the RMS pressure Pa;
f is frequency of displacement;
t is the exposure time in minutes;
k is a proportionality factor, such as 1.8;
x is a constant, such as 2; and
MSI is Motion Sickness Incidence in %.

Equation 2.1 was developed with the availability of the MSI response data provided in McCauley et al., appendix B, and the understanding provided by McCauley et al. that the log of exposure time appeared to have a material influence on MSI.

Figure 23:
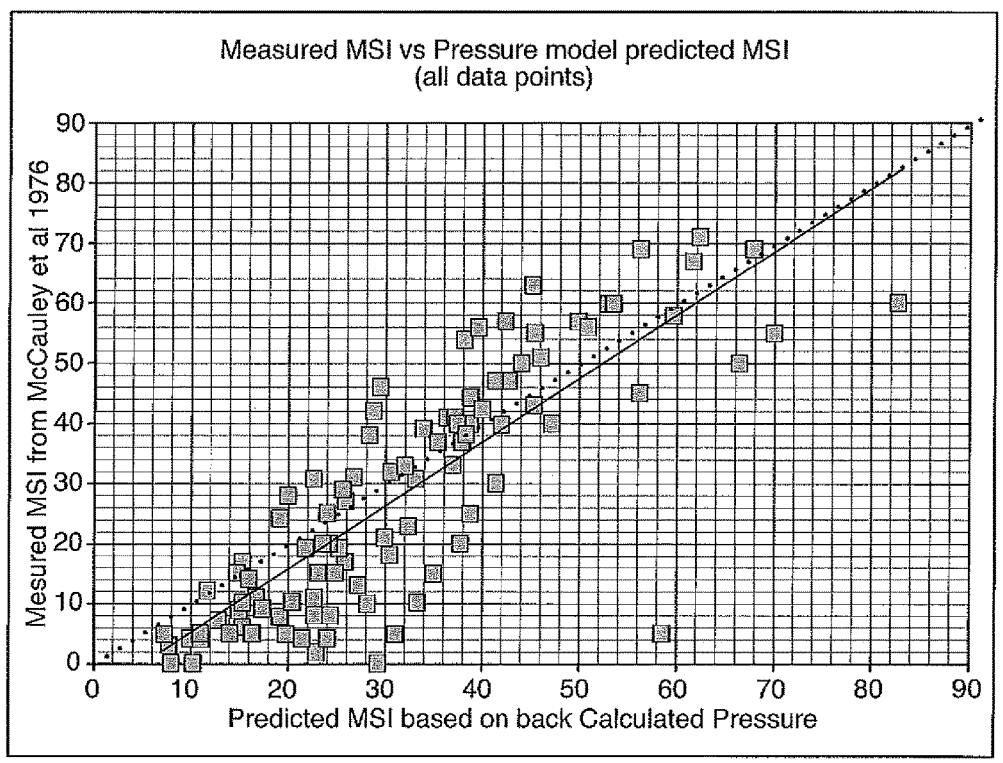
FIG. 23 illustrates measured MSI for all data points from McCauley et al. plotted against the MSI pressure model.
Figure 24:
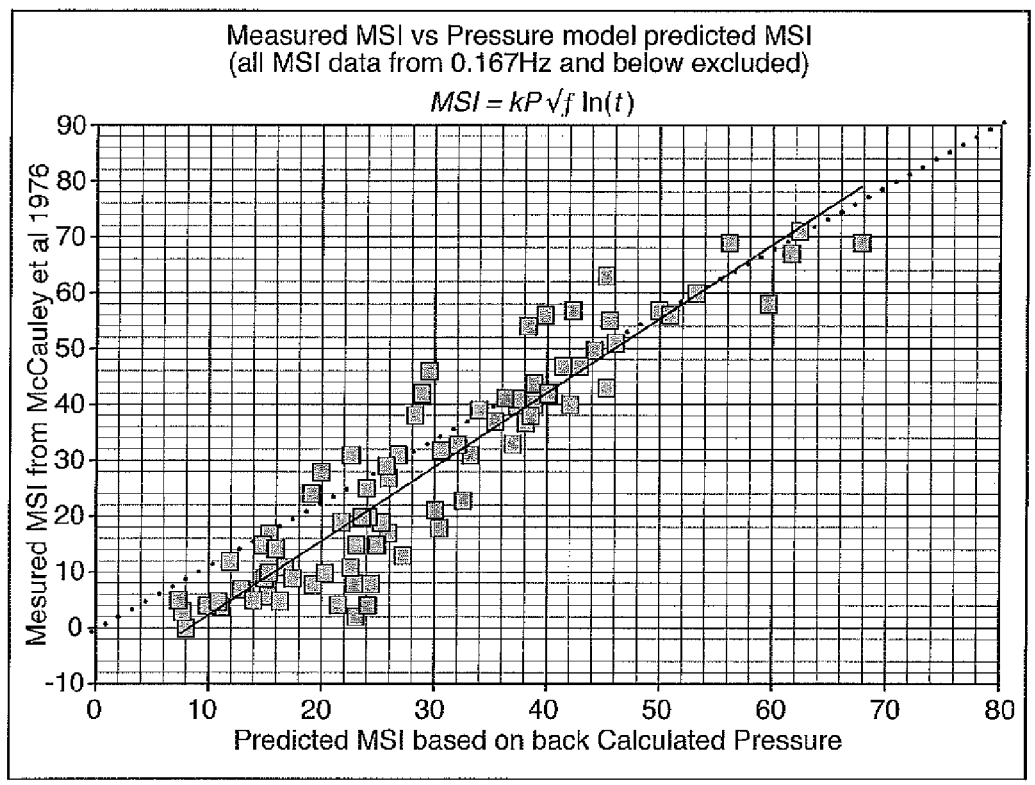
FIG. 24 illustrates measured MSI for data points from McCauley et al., with data points from 0.167 Hz and below excluded, plotted against the MSI pressure model.

FIG. 23 and FIG. 24 are graphic results of a comparison between the simple infrasonic pressure based MSI model of equation 2.1 and real MSI results from McCauley et al., appendix B.

Figure 25:
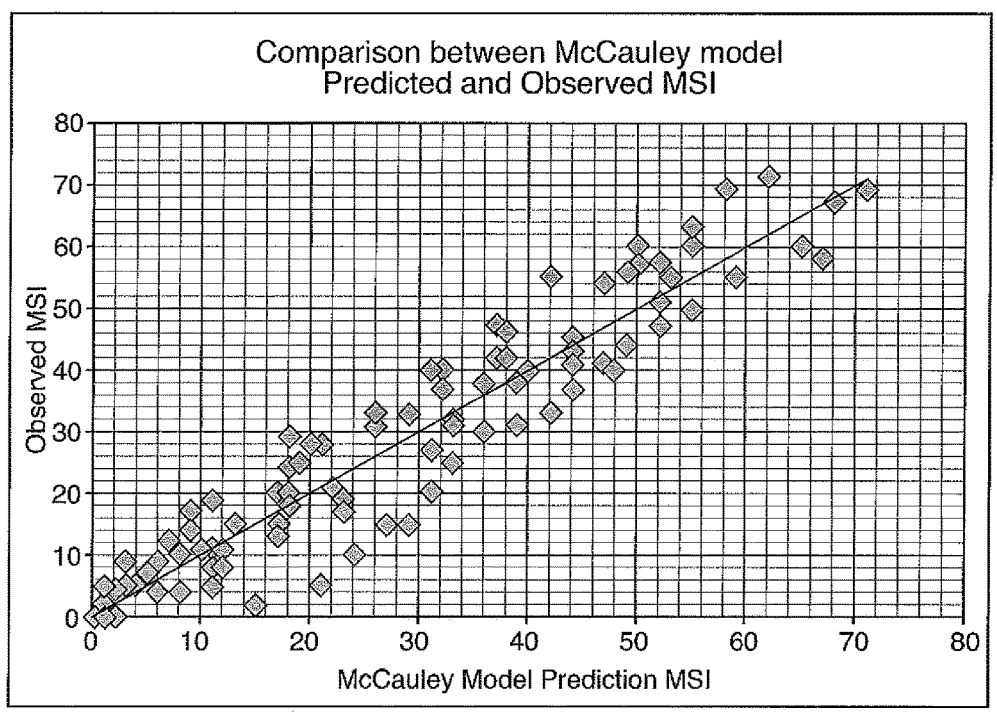
FIG. 25 illustrates a comparison between the predicted MSI model of McCauley et al. (x-axis) versus the MSI values observed by McCauley et al. (y-axis)

FIG. 23 is the graph of the complete data set from McCauley et al., appendix B that was used to develop the McCauley model, FIG. 24 is the same data except with the 0.167 Hz and below data points removed, FIG. 25 is a similar graph showing the McCauley et al. predictions versus the observed MSI.

The 0.167 Hz data points were excluded in the FIG. 24 graph because close examination of the MSI data (FIG. 26 and FIG. 27) seems to reveal a discontinuity when comparing observed MSI to pressure. The discontinuity is limited to the 0.167 Hz data (this is based on the assumption that the presented hypothesis is correct).

The apparent "resonance" at 0.166 Hz shown in the McCauley 3D graph (FIG. 22), also does not seem to be the cause of the discontinuity, since the McCauley et al. data is lower at the 0.166 Hz frequency than the MSI infrasonic pressure model (2.1) predicts it would be. The possibility that the test chamber leakage rate suddenly changed as the g level was increased from 0.111 g to 0.222 g (the response in MSI jumped up by a factor of at least 10 at this transition), or that an undetected Helmholtz resonance was altered cannot be discounted. The McCauley et al. data table did not include MSI data at the 15 minute exposure interval for the 0.111 g acceleration level, so it may have actually been zero (i.e. no MSI response from test subjects).

Figure 26:
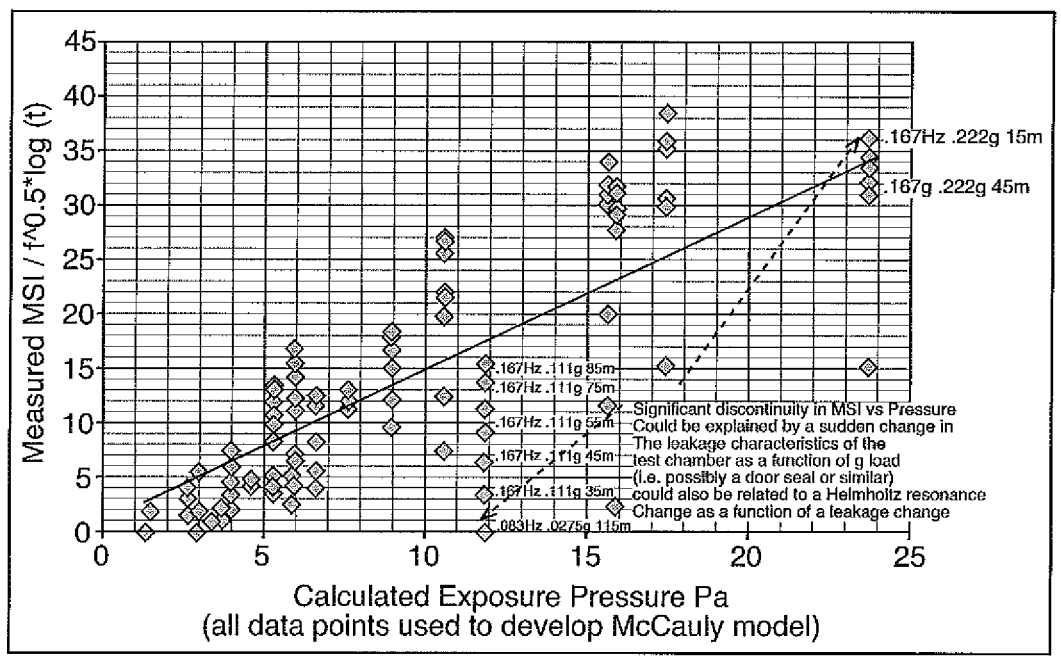
FIG. 26 illustrates a comparison between the MSI pressure model in accordance with an example embodiment (x-axis) versus MSI values observed by McCauley et al., for all data points (y-axis)

FIG. 23 is a graph of all MST experimental data provided in appendix B of McCauley et al. plotted against the presently described MSI infrasonic pressure model. The dotted line on the graph is the pressure model predictions (based on subject exposure to infrasonic pressure alone). The solid line is the mean value of all data points based on infrasonic pressure. It was noticed during examination of the data as a function of calculated pressure, that an apparent discontinuity was exhibited in the 0.167 Hz data alone (FIG. 26).

The data is re-plotted in FIG. 24 with the 0.167 Hz and below data points excluded. FIG. 24 is a graph of all MSI experimental data provided in appendix B of McCauley et al., except data at 0.167 Hz and below have been excluded. The experimental MSI responses are plotted against the MSI pressure model described herein. The dotted line on the graph is the pressure model prediction (based on subject exposure to infrasonic pressure alone). The solid line is the mean value of all data points included, based on the pressure model.

The graph of FIG. 25 shows the comparison between the McCauley et al. model predicted MSI (x-axis) versus the observed MSI values (y-axis). The complicated McCauley et al. MSI model is calculated as follows:

$$MSI = \frac{100}{2\pi\sigma_a\sigma_t\sqrt{1-\rho^2}}$$
$$\int_{-\infty}^{\log_{10}a}\int_{-\infty}^{\log_{10}t}\exp\left\{\frac{-1}{2(1-\rho^2)}\left[\left(\frac{x-\mu_a(f)}{\sigma_a}\right)^2 - 2\rho\left(\frac{x-\mu_a(f)}{\sigma_a}\right)\right.\right.$$
$$\left.\left.\left(\frac{y-\mu_t}{\sigma_t}\right) + \left(\frac{y-\mu_t}{\sigma_t}\right)^2\right]\right\}dy\,dx = 100\Phi(a,t)$$

By way of comparison, the Pressure Model for MSI is provided as follows, in accordance with an example embodiment:

$$MSI = 1.8Pf^{\frac{1}{x}}\ln(t)$$

where:
P is the RMS pressure Pa;
f is frequency of displacement;
t is the exposure time in minutes;
x is a constant, such as 2; and
MSI is Motion Sickness Incidence %.

By comparing with the McCauley et al. MSI model, the simplicity can be seen in the presented MSI pressure model, in accordance with an example embodiment.

A potential discontinuity in data was observed in the 0.167 Hz data set. The potential discontinuity is revealed when analyzing MSI data as a function of back-calculated pressure related to vertical motion versus MSI divided by f^0.5*log(t), which is effectively an alternate method of back calculation of un-scaled pressure based on the hypothesis presented.

FIG. 26 is a graph of all MSI data provided in McCauley et al., appendix B, which were used to develop the McCauley model for MSI and were used here to calibrate the Pressure model for MSI. The MSI data has been divided by log time and square root of frequency. A discontinuity seems to show up in the MSI response data from the 0.167 Hz data group (no 15 minute point at 0.111 g and 0.167 Hz included in the McCauley et al data).

The MSI response jumps up by a factor of ten between the 0.167 Hz at 0.111 g and the 0.167 Hz at 0.222 g (see arrows on graph).

This result could be explained by a sudden increase in the leakage rate of the test subject compartment of the motion generator at 0.222 g, or possibly a change in a Helmholtz resonance due to a change in leakage characteristics at one of the conditions. Since the equipment was not designed with pressure response to the environment as a design parameter, this explanation may be reasonable.

Figure 27:
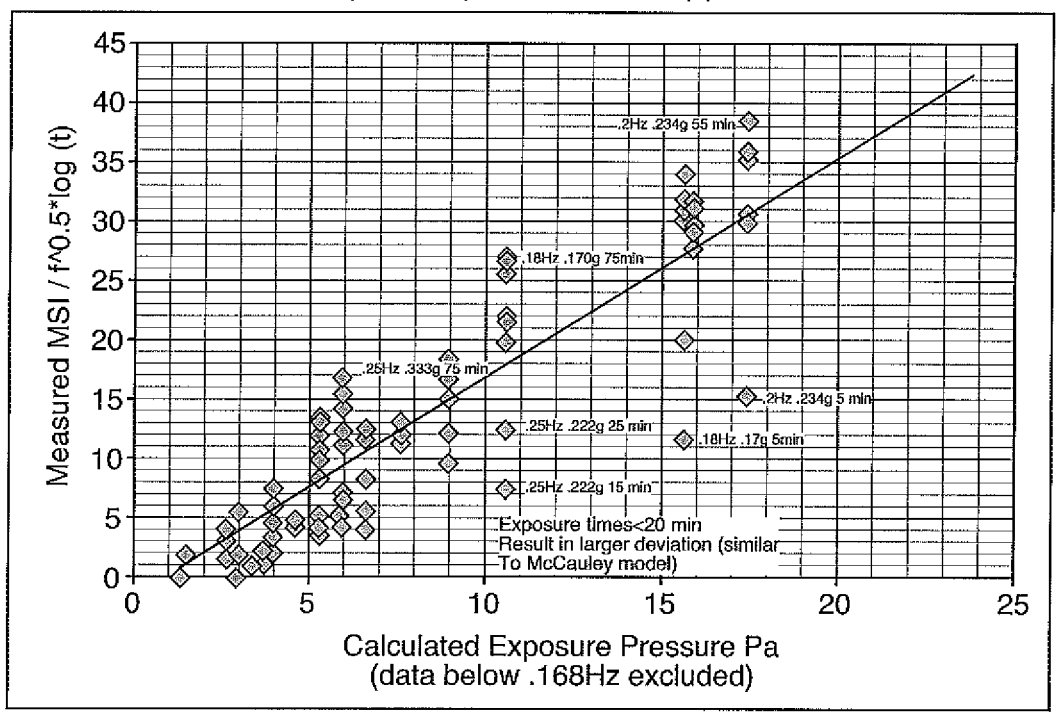
FIG. 27 illustrates a comparison between the MSI pressure model in accordance with an example embodiment (x-axis) versus the MSI values observed by McCauley et al., with data points from 0.167 Hz and below excluded (y-axis)

FIG. 27 is a graph similar to FIG. 26 except the 0.167 Hz data has been excluded. This illustrates the possible discontinuity of the 0.167 Hz experimental data, by significantly reducing the scatter between experimentally measured pressure (based on the hypothesis) and MSI, and calculated infrasonic pressure fluctuations based on vertical motion.

In general the simple pressure model provided, in accordance with some example embodiments, correlates well with the experimental data from McCauley et al. as shown by FIG. 23. A reduced overall scatter is realized when apparently discontinuous data points from 0.167 Hz are excluded as shown by FIG. 24. The slight droop in MSI data in the lower pressure range relative to calculated values visible in FIGS. 23 and 24, could easily be explained as being due to the slower pressure equalization time of the test compartment with the outside infrasonic pressure, at lower pressure differentials (i.e. partial compartment sealing). The infrasonic pressure model for MSI (or nausea) developed here may provide insight into several areas.

The pressure model for MSI can be applied to improving the comfort of passengers and crew in ships or other vehicles, a semi-sealed compartment where the external infrasound levels due to vertical (or other) motion may be prevented from communicating to the inside of the compartment easily, or an active infrasound cancellation system may be employed to attenuate the infrasonic pressures.

The simplicity and accuracy of the pressure model for MSI relative to the existing MSI model (FIG. 25), in conjunction with separate reports of infrasound related nausea and discomfort, tends to support the validity of the model concept.

Calculations of MSI for much lower infrasonic pressure levels over significantly longer time periods reveal an interesting trend. A calculation performed at 0.72 Hz with an un-weighted SPL of 60 dB yields an MSI of 0.35% after 2.5 months. At 20 Hz and the same SPL of 60 dB the model predicts an MSI of 1.9% after 2.5 Months.

As well, it is recognized that an individual may have an increased tendency to fall asleep in the presence of infrasound has a significantly higher probability than without infrasound, which is undesirable for a driver of a vehicle, for example. Infrasound may also impair mental cognitive function and task effectiveness, for example. These afflictions can also be present when in a moving vehicle, as a result of infrasound disruptions due to the movement of the vehicle.

Figure 18:
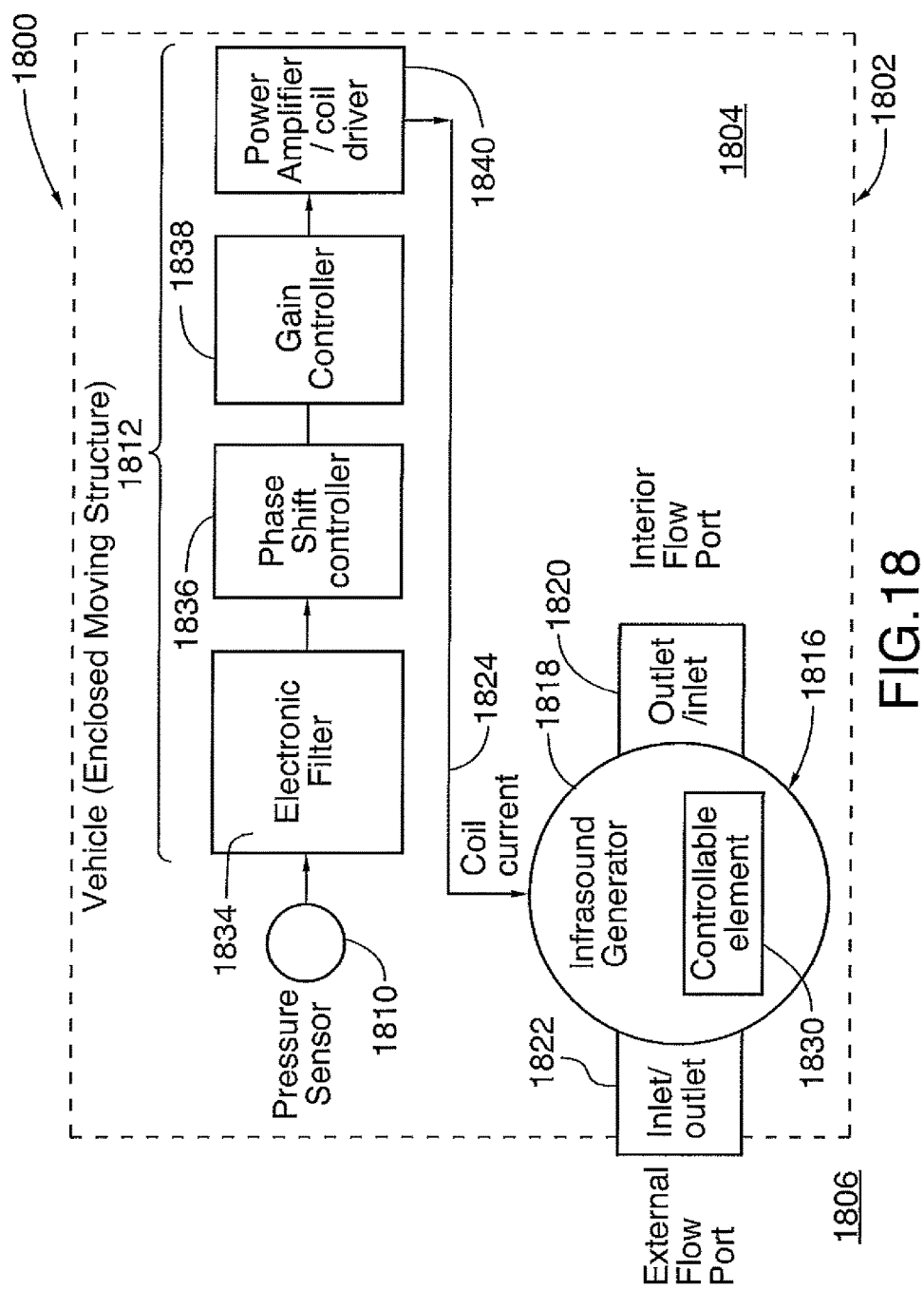
FIG. 18 illustrates a detailed block diagram of an example system configured to control at least one pressure disruption inside a structure, in accordance with another example embodiment.

Reference is now made to FIG. 18, which illustrates a detailed block diagram of an example system 1800 configured to control a source of physiological affliction from pressure disruptions within an enclosed moving structure 1802, such as part or all of a vehicle, in accordance with an example embodiment. Moving as referred to herein includes displacement or traversal of the structure 1802, rather than merely vibration, etc.

The vehicle can be, for example, a car, bus, truck, boat, etc. The structure 1802 can be, in some example embodiments, one room or cabin of a boat or vessel with the door closed, an interior of a passenger car with the windows up, or any generally enclosed space which is typically occupied by a passenger and of a sufficiently small size that can have the pressure controlled by at least one infrasound pressure generator. By way of example, a passenger car can be on or about 3 cubic meters, a passenger bus can be on or about 30 cubic meters, and a boat cabin can be on or about 50 cubic meters.

In some example embodiments, the system 1800 can require as little as one internal pressure sensor in some instances, depending on the relatively small size of the structure 1802. In some example embodiments, infrasound can occur within these vehicles, and many other moving structures, due to vertical displacement and change in Barometric Pressure, even without an external source of infrasound disturbance. In some example embodiments, the physiological affliction includes at least one of discomfort, motion sickness, nauseogenicity, mental cognition, and tendency to sleep, of an occupant within the structure 1802.

As shown in FIG. 18, the structure 1802 can be part of a vehicle and can define an interior 1804 and have an associated exterior 1806. The system 1800 includes at least one infrasound generator 1816. The structure 1802 can be enclosed, and the interior 1804 can be of a relatively small space so that it can be controlled by the at least one infrasound generator 1816. For larger sizes of the interior 1804, multiple infrasound generators 1816 can be sound with their pressure fluctuation generations co-ordinated appropriately. While the generator 1816 is illustrated as being located in the interior 1804 of the structure 1802, in other example embodiments the generator 1816 is located at the exterior 1806 of the structure, with the interior opening interface 1820 interfacing with the interior 1804 from the outside.

At least one pressure sensor 1810 is located to sense pressure indicative of the interior 1804 of the structure 1802, and provide a signal representative thereof. For example, the pressure sensor 1810 can be located in the interior 1804. For example, the pressure sensor 1810 can be the pressure sensor 700 (FIG. 7). At least one controller 1812 can be configured to: determine, from pressure sensor information of the pressure sensor 1810, at least one Ultrasound disturbance within the interior 1804 of the structure 1802. The at least one controller 1812 can be configured to control the at least one infrasound generator 1816 to cancel the at least one infrasound disturbance within the interior 1804 of the structure 1802.

The at least one controller 1812 can include an electronic filter 1834, a gain controller 1838, and an amplifier 1840, in some example embodiments. The electronic filter 1834 can be one or more band-pass or lowpass filters to filter at least one or numerous harmonics, including a fundamental harmonic, second harmonic, third harmonic, etc. The gain controller 1838 is configured for determining and applying the amount of gain to the signal. The signal from the gain controller 1838 is fed to the amplifier 1840, to cancel the pressure oscillations within the interior 1804, representative of the one or more harmonic frequencies. A control loop can be used to determine the amount of gain required. If needed, a phase shift controller 1836 can also be used, depending on the requirements of the system 1800, to compensate for system lag, to account for the location of the pressure sensor 1810, for example.

As shown in FIG. 18, the at least one infrasound generator 1816 includes a housing 1818 which defines an interior opening interface 1820 open to the interior 1804 of the structure 1802 and an exterior opening interface open 1822 to the exterior 1806 of the structure 1802. The infrasound generator 1816 includes a controllable element 1830, such as the coil current 1824 to an electromagnetic coil, in order to produce the infrasound which negatives the infrasound disruption in the interior 1804.

In some example embodiments, the system 1800 and the infrasound generator 1816 of FIG. 18 is embodied by at least some or all of the system 100 and the reversible compressor 116, described in detail herein in relation to at least FIG. 2.

The at least one controller 1812 can also calculate an amount of motion sickness, such as the Motion Sickness Incidence using the MSI pressure model described herein, due to the at least one infrasound disturbance within the interior of the structure 1802. For example, equation 2.1 can be used. A user interface can be provided which advises the user (e.g. vehicle driver) of the amount of infrasound present, the amount of motion sickness, as well as the new (reduced) amount of infrasound present based on the cancellation of the infrasound, as well as the new (reduced) amount of motion sickness. Other information can also be provided through the user interface, depending on the particular type of information desired. Once the value(s) of MSI are determined, these value(s) of MSI can be output, tracked, saved, used for present or future analytics, and/or sent to another device, for example.

Figure 19:
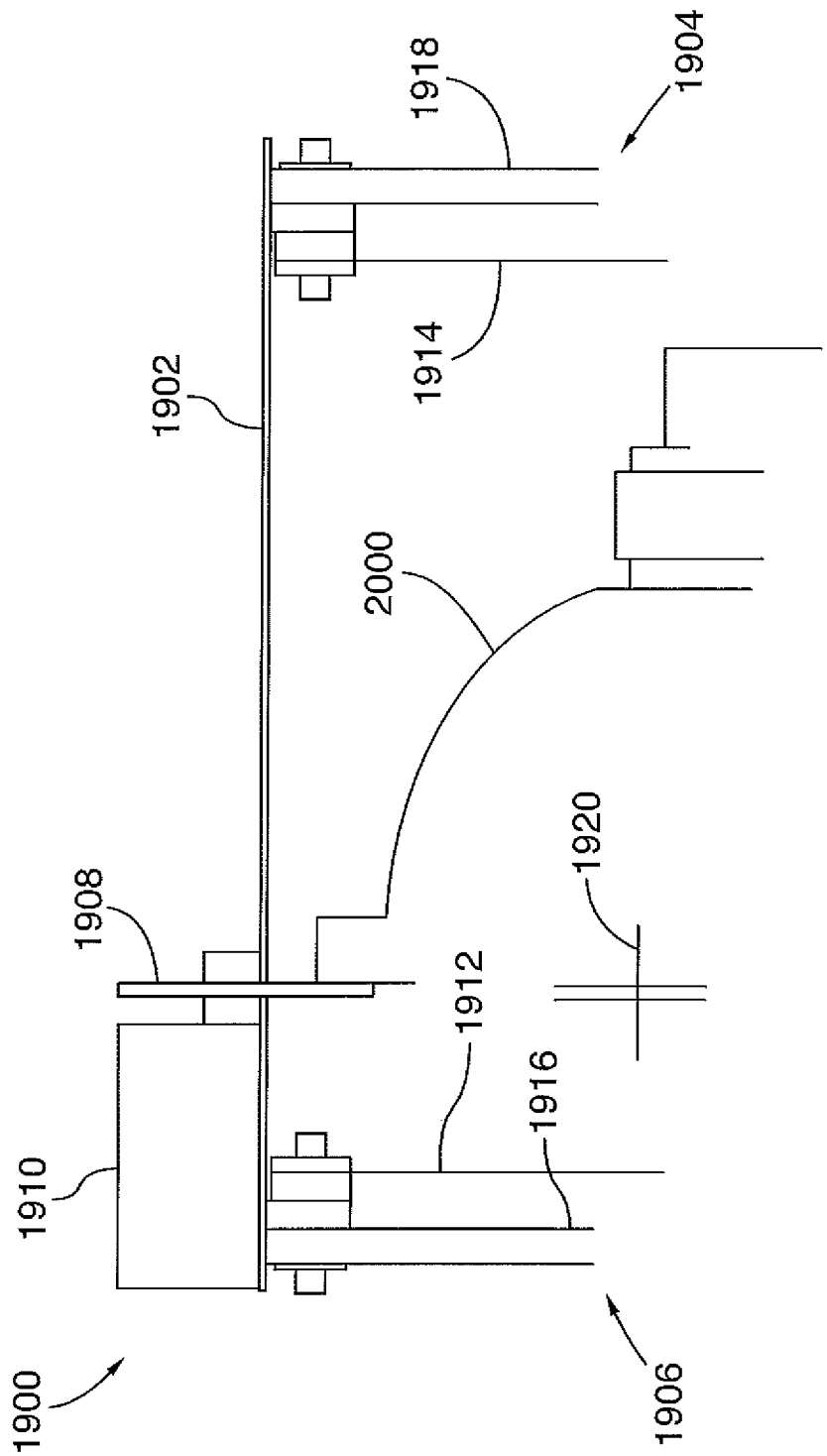
FIG. 19 illustrates in diagrammatic form a partial top-half cross section of an example infrasound generator, in accordance with an example embodiment, the remaining partial bottom-half cross-section being substantially a mirror image thereof (not shown here)

FIG. 19 illustrates another example infrasound generator 1900, in accordance with another example embodiment. The infrasound generator 1900 can be embodied as the infrasound generator 1816 in the system 1800 of FIG. 18, or the reversible compressor unit 118 of FIG. 2, for example. The infrasound generator 1900 can include a sub-audible frequency speaker, such as 20 Hz or lower.

The infrasound generator 1900 includes a suitable speaker 2000 or similar type oscillating device which can be controlled to provide pressure fluctuations to cancel any pressure fluctuation disturbances. A housing 1902 or duct houses the speaker 200, and defines an interior opening interface 1904 open to the interior 1804 of the structure 1802 (FIG. 18), and an exterior opening interface 1906 open to the exterior 1806 of the structure 1802 (FIG. 18). This contrasts, for example, with typical conventional speakers which have an enclosed cabinet with only one open end to emanate sound.

The speaker 2000 is supported by a mount 1908, which can be a flange. The mount 1908 can also be used to mount the generator 1900 to the structure 1802 (FIG. 18). An electrical connector box 1910 can interface with, and/or include at least some of, the at least one controller 1812 (FIG. 18). Parts of the electrical connector box 1910 can be used to control the speaker 2000.

A first diaphragm 1912 is mounted at the exterior interface 1906, and a second diaphragm 1914 is mounted at the interior interface 1904. Each diaphragm 1912, 1914 can be, for example, a latex rubber membrane. The latex rubber membrane can be stretched tight, and be for example 0.01 inches. Accordingly, in some example embodiments, a conventional speaker 2000 can be used without having a leakage of air, heat, humidity or bugs, etc., from outside to inside. The diaphragm 1912, 1914 also can prevent foreign entry to the speaker 2000 and associated components, such as the speaker coil or cone. In an example embodiment, the diaphragm 1912, 1914 may form a vapor/thermal barrier, to prevent condensation on the surface of the speaker 2000. The diaphragms 1912, 1914 move or deflect when the speaker diaphragm 2012 (FIG. 20) deflects, in the same direction.

There is a substantially pressure tight seal caused by the speaker diaphragm 2012 (FIG. 20) between the interior cavity and the exterior cavity, in some example embodiments. In some example embodiments, a bleed tube 1920 can be used for gradually equalizing the pressure difference across the speaker diaphragm 2012 (FIG. 20), through very slow leakage. The bleed tube 1920 does not substantially affect the particular frequencies of operation of the speaker diaphragm 2012. In an example embodiment, a first screen 1916 and second screen 1918, such as a grill, can further be used for protection and prevention of foreign entry to affect the diaphragm 1912, 1914 or the speaker 2000.

In an example embodiment, the infrasound generator 1900 can be used for higher frequency cancellations in relatively smaller places, such as vehicles, bedrooms etc. The infrasound generator 1900 can also be used at lower frequencies, such as 20 Hz or lower.

Figure 20:
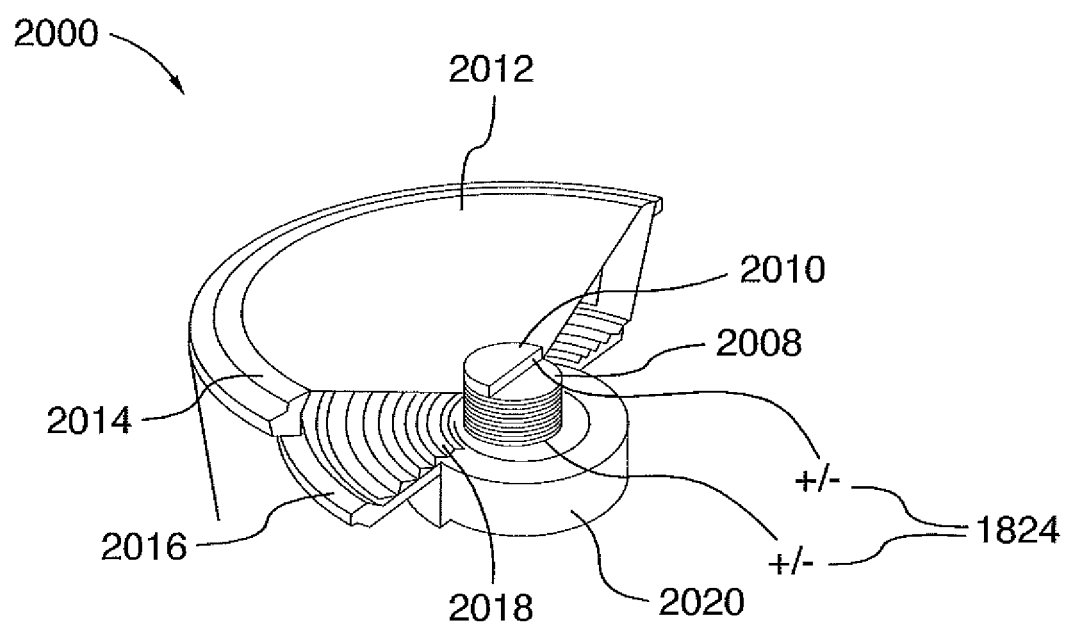
FIG. 20 illustrates a cut-away perspective view of an example speaker for the infrasound generator of FIG. 19, in accordance with an example embodiment.

FIG. 20 illustrates an example speaker 2000 for the infrasound generator 1900, in accordance with an example embodiment. The term "speaker" is used in terms of the system components for convenience of understanding, with the understanding that sub-audible pressure fluctuations can be generated. As shown in FIG. 20, the example speaker 2000 can include an electromagnetic coil 2008, sometimes referred to as a voice coil. In some example embodiments, the speaker 2000 can also include, for example, a dust cap 2010, at least one diaphragm 2012 (which can be cone-shaped), suspension 2014, basket 2016, spider 2018, and a magnet 2020. The magnet 2020 can be a permanent magnet which is supported by the spider 2018 and the basket 2016.

The electromagnetic coil 2008 can be controlled by the amplifier 1840 shown in FIG. 18, for example. When the electrical current flowing through the electromagnetic coil 2008 changes direction, the polar orientation of the coil 2008 reverses. This changes the magnetic forces between the coil 2008 and the permanent magnet 2020, moving the coil 2008 which provides motive force to the attached diaphragm 2012, which then moves back and forth. The electromagnetic coil 2008 is positioned in a constant magnetic field created by the permanent magnet 202. For example, the positive end of the electromagnetic coil 2008 is attracted to the negative pole of the permanent magnetic field, and the negative pole of the electromagnetic coil 2008 is repelled by the permanent magnet's negative pole. When the polar orientation of the electromagnetic coil 2008 switches, so does the direction of repulsion and attraction. In this way, alternating current from the amplifier 1840 (FIG. 18) constantly reverses the magnetic forces between the coil 2008 and the permanent magnet 2020. This pushes the coil 2008 back and forth rapidly.

When the coil 2008 moves, it pushes and pulls on the diaphragm 2012. This vibrates the air in front of the diaphragm 2012, creating pressure oscillations. The frequency and amplitude of the pressure change, which can be representative of the original signal from the amplifier 1840, dictates the rate and distance that the coil 2008 moves. This, in turn, determines the frequency and amplitude of the pressure oscillations produced by the diaphragm 2012.

The speaker 2000 can be controlled by way of movement of the coil 2008, so that air pressure affected at the interior opening interface 2004, to cancel any existing cyclic pressure disruptions such as infrasound.

In at least some example embodiments, there is a pressure tight seal caused by the speaker diaphragm 2012 (FIG. 20) between the interior cavity and the exterior cavity of the infrasound generator 1900 (FIG. 19). Accordingly, in some example embodiment, there is little or no air flow through the speaker diaphragm 2012 (other than, for example, the gradual bleed tube 1920 in FIG. 19, which does not substantially affect operation). In some example embodiments, the speaker diaphragm 2012 does not cause airflows through the infrasound generator 1900 as such, but rather the pressure changes are a result of variability in the inside the structure 1802, and the volume of the interior 1804 (FIG. 18) being controlled. This results in the generation of infrasound pressures to cancel the pressure disruptions. In some example embodiment, the infrasound generator 1900 can be thought of as a variable wall position, which varies the volume of the interior 1804 (FIG. 18) as the speaker diaphragm 2012 moves in and out to equalize the pressure disruptions, and as such does not substantially roll off in frequency response. Referring again to FIG. 19, in some example embodiments, note that the interior diaphragm 1914 can act as this variable "wall", which oscillates under the influence of the speaker diaphragm 2012 (FIG. 20). In some example embodiments, this operation is suited for enclosed spaces such as the relatively small vehicles or structures described herein.

Another example of an infrasound generator is a TRW-17 Thigpen Rotary Woofer, available from Eminent Technology. Referring to FIG. 18, in this type of example infrasound generator, the electromagnet coil (voice coil) is used to control the pitch or angle of rotating blades from the centralized electromagnetic coil, in order to produce low frequencies. In example embodiments, this type of system can be configured to have a housing which defines an interior opening interface open to the interior 1804 of the structure 1802 and an exterior opening interface open to the exterior 1806 of the structure 1802, in order to cancel (equilibrate) any cyclic pressure disturbances such as infrasound within the structure 1802.

In some other example embodiments, any suitable pressure oscillation generator can be used as the infrasound generator 1816, so long as pressure fluctuations can be controlled within the interior 1804.

Figure 28:
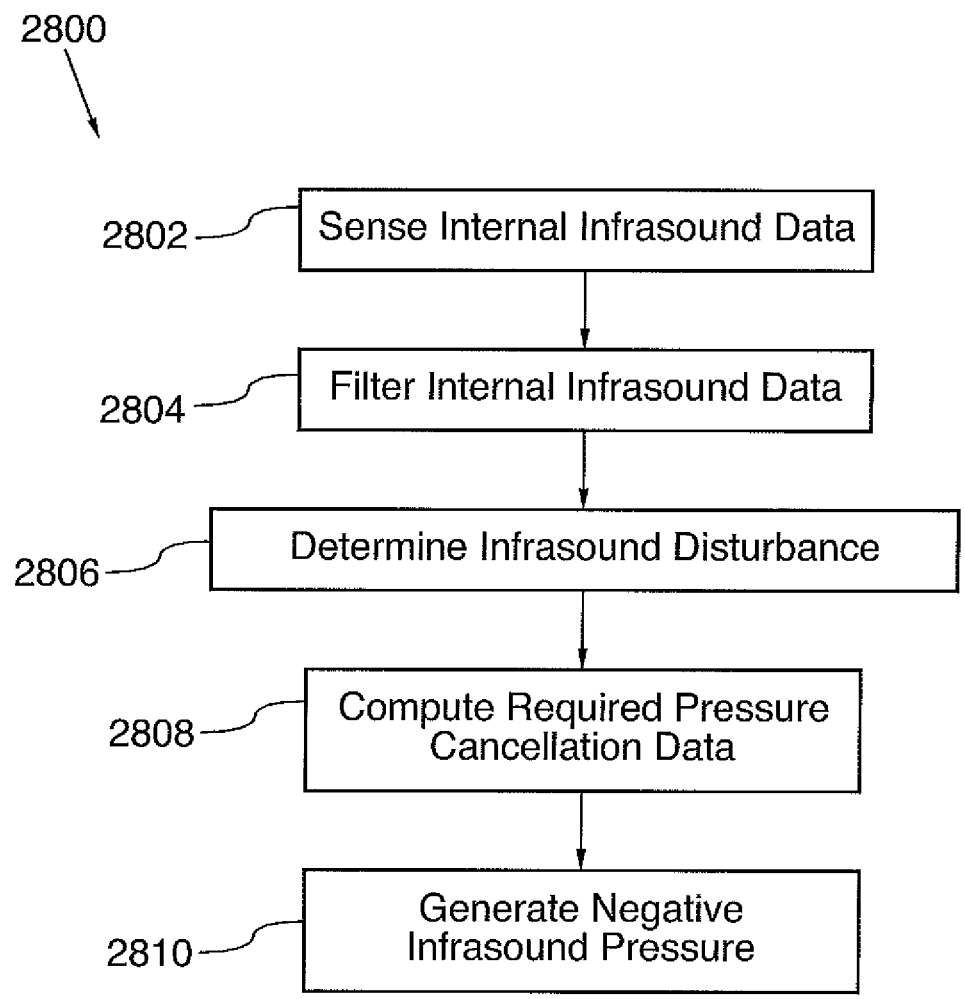
FIG. 28 illustrates a flow diagram of an example method for controlling infrasound, in accordance with an example embodiment.

FIG. 28 illustrates a flow diagram of an example method 2800 for controlling a source of physiological affliction, within a moving enclosed structure, in accordance with an example embodiment. The method 2800 can be implemented by the system 1800 of FIG. 18, in some example embodiments.

At event 2802, the method 2800 includes determining pressure sensor information indicative of the interior 1804 of the structure 1802. At event 2804, the band pass electronic filter(s) 1834 band pass filter specified harmonics from the pressure sensor information.

At event 2806, the method 2800 includes determining, from the filtered pressure sensor information (e.g. at least one or all of the harmonics), at least one infrasound disturbance within the interior 1804 of the structure 1802. This can include "locking" into a periodic or cyclic detected infrasound disruption. At event 2808, the method 2800 includes determining or calculating at least one frequency of infrasound, and associated amplitude, to control the infrasound generator 1816 that will cancel the at least one infrasound disturbance. Reference to at least one frequency includes determining one or more specific frequencies as well as a broadband range of frequencies, such as to regulate the internal pressures from, for example, on or about 0.05 Hz to on or about 20 Hz. In some example embodiments, this is accomplished by applying at least one gain to at least one detected frequency harmonic of infrasound (which can be phase-shifted, if needed). At event 2810, the method 2800 includes applying the determined frequency and amplitude to the infrasound generator 1816, by controlling at least one controllable element 1830 of the infrasound generator 1816 to cancel the at least one infrasound disturbance within the interior 1804 of the structure 1802.

In some example embodiments, reference to controllers includes analog controller devices, digital controller devices, and/or a combination of analog and digital controller devices. At least some of all of the functions of the controller can be performed by a digital microprocessor system and/or digital signal processing (DSP) technology.

In some example embodiments, the described systems and reversible compressors can be used for reducing discomfort or sickness of an occupant within the structure due to an external infrasound source or intrinsic infrasound based on movement of the structure.

In accordance with an example embodiment, there is provided a non-transitory computer-readable medium containing instructions executable by at least one controller device or processor device for performing any or all of the described methods.

In any or all of the described methods, the boxes or algorithm lines may represent events, steps, functions, processes, modules, state-based operations, etc. While some of the examples have been described as occurring in a particular order, it will be appreciated by persons skilled in the art that some of the steps or processes may be performed in a different order provided that the result of the changed order of any given step will not prevent or impair the occurrence of subsequent steps. Furthermore, some of the messages or steps described may be removed or combined in other embodiments, and some of the messages or steps described may be separated into a number of sub-messages or sub-steps in other embodiments. Even further, some or all of the steps may be repeated, as necessary. Elements described as methods or steps similarly apply to systems or subcomponents, and vice-versa. Reference to such words as "sending" or "receiving" could be interchanged depending on the perspective of the particular device.

While some example embodiments have been described, at least in part, in terms of methods, a person of ordinary skill in the art will understand that some example embodiments are also directed to the various components for performing at least some of the aspects and features of the described processes, be it by way of hardware components, software or any combination of the two, or in any other manner. Moreover, some example embodiments are also directed to a pre-recorded storage device or other similar computer-readable medium including program instructions stored thereon for performing the processes described herein. The computer-readable medium includes any non-transient storage medium, such as RAM, ROM, flash memory, compact discs, USB sticks, DVDs, HD-DVDs, or any other such computer-readable memory devices.

Although not specifically illustrated, it will be understood that the devices described herein can include one or more processors or controllers and associated memory. The memory may include one or more application program, modules, or other programming constructs containing computer-executable instructions that, when executed by the one or more processors or controllers, implement the methods or processes described herein.

The various embodiments presented are merely examples and are in no way meant to limit the scope of this disclosure. Variations of the innovations described herein will be apparent to persons of ordinary skill in the art, such variations being within the intended scope of the present disclosure. In particular, features from one or more of the described embodiments may be selected to create alternative embodiments comprised of a sub-combination of features which may not be explicitly described. In addition, features from one or more of the described embodiments may be selected and combined to create alternative embodiments comprised of a combination of features which may not be explicitly described. Features suitable for such combinations and sub-combinations would be readily apparent to persons skilled in the art upon review of the present disclosure as a whole. The subject matter described herein intends to cover and embrace all suitable changes in technology.

The invention claimed is:

1. A system for controlling a source of physiological affliction within a moveable enclosed structure defining an interior, comprising:
   at least one infrasonic pressure fluctuation (infrasound) generator located in or on the structure;
   at least one pressure sensor located within the interior of the structure to sense pressure indicative of the interior of the structure; and
   at least one controller configured to:
   determine, from pressure sensor information of the at least one pressure sensor, at least one infrasound disturbance within the interior of the structure at least due to movement of the structure; and
   control the at least one infrasonic pressure fluctuation (infrasound) generator to suppress the at least one infrasound disturbance within the interior of the structure to result in a substantially constant pressure as a function of time within the interior of the structure.

2. The system as claimed in claim 1, wherein the movement of the structure includes a cyclic vertical displacement which causes the at least one infrasound disturbance due to changes in Barometric Pressure.

3. The system as claimed in claim 1, wherein the at least one controller is further configured to control at least one frequency of infrasound of the at least one infrasonic pressure fluctuation (infrasound) generator to suppress the at least one infrasound disturbance.

4. The system as claimed in claim 1, wherein each infrasonic pressure fluctuation (infrasound) generator defines an interior opening interface open to the interior of the structure and an exterior opening interface open to the exterior of the structure.

5. The system as claimed in claim 1, wherein the physiological affliction includes at least one of discomfort, motion sickness, nauseogenicity, mental cognition impairment, or tendency to sleep, of an occupant within the structure.

6. The system as claimed in claim 1, wherein at least one of the infrasonic pressure fluctuation (infrasound) generators includes:
   a housing which defines an interior opening interface and an exterior opening interface;
   an electromagnetic coil to provide motive force with an applied current, wherein a controllable element is the applied current to the coil;
   a diaphragm which is substantially air-sealed between the interior opening interface and the exterior opening interface and operably connected to the coil to resonate in response to motive force of the coil to generate pressure changes to the interior opening interface.

7. The system as claimed in claim 1, wherein at least one of the infrasonic pressure fluctuation (infrasound) generators includes a sub-audible frequency speaker having a housing which defines an interior opening interface open to the interior of the structure and an exterior opening interface open to the exterior of the structure.

8. The system as claimed in claim 1, wherein at least one of the infrasonic pressure fluctuation (infrasound) generators includes a two-way compressor.

9. The system as claimed in claim 1, wherein the moveable enclosed structure is at least part of a vehicle.

10. The system as claimed in claim 1, wherein a volume of the interior is about 50 cubic meters or less.

11. The system as claimed in claim 1, wherein a volume of the interior is about 3 cubic meters or less.

12. The system as claimed in claim 1, wherein the controller is further configured to use a model to calculate, from the pressure sensor information, an amount of the potential physiological affliction due to the at least one infrasound disturbance within the interior of the structure.

13. The system as claimed in claim 12, wherein the model is for calculating an amount of motion sickness, as follows:

$$MSI = kPf^{\frac{1}{x}}\ln(t)$$

where:
P is pressure;
f is frequency of displacement;
t is exposure time;
k is a proportionality factor;
x is a constant; and
MSI is a Motion Sickness Incidence.

14. A method for controlling a source of physiological affliction within a moving enclosed structure defining an interior, comprising:
   determining pressure sensor information indicative of the interior of the structure using a pressure sensor located within the interior of the structure;
   determining, from the pressure sensor information, at least one infrasonic pressure fluctuation (infrasound) disturbance within the interior of the structure at least due to movement of the structure; and
   controlling, using at least one controller, at least one controllable element of at least one infrasonic pressure fluctuation (infrasound) generator located in or on the structure to suppress the at least one infrasound disturbance within the interior of the structure to result in a substantially constant pressure as a function of time within the interior of the structure.

15. The method as claimed in claim 14, wherein the movement of the structure includes a cyclic vertical displacement which causes the at least one infrasound disturbance due to changes in Barometric Pressure.

16. The method as claimed in claim 14, further comprising controlling at least one frequency of infrasound of the at least one infrasonic pressure fluctuation (infrasound) generator to suppress the at least one infrasound disturbance.

17. The method as claimed in claim 14, wherein each infrasonic pressure fluctuation (infrasound) generator defines an interior opening interface open to the interior of the structure and an exterior opening interface open to the exterior of the structure.

18. The method as claimed in claim 14, wherein the physiological affliction includes at least one of discomfort, motion sickness, nauseogenicity, mental cognition impairment, or tendency to sleep, of an occupant within the structure.

19. The method as claimed in claim 14, further comprising calculating, using a model, an amount of the potential physiological affliction due to the at least one infrasound disturbance.

20. At least one controller device configured to perform the method of claim 14.

21. A system for controlling a source of physiological affliction within a moveable enclosed structure defining an interior, comprising:

at least one infrasonic pressure fluctuation (infrasound) generator located in or on the structure;

at least one pressure sensor located within the interior of the structure to sense pressure indicative of the interior of the structure; and at least one controller configured to:

determine, from pressure sensor information of the at least one pressure sensor, at least one infrasound disturbance within the interior of the structure; and control the at least one infrasonic pressure fluctuation (infrasound) generator to suppress the at least one infrasound disturbance within the interior of the structure, wherein at least one of the infrasound generators includes:

a housing which defines an interior opening interface and an exterior opening interface;

an electromagnetic coil to provide motive force with an applied current, wherein a controllable element is the applied current to the coil; and a diaphragm which is substantially air-sealed between the interior opening interface and the exterior opening interface and operably connected to the coil to resonate in response to motive force of the coil to generate pressure changes to the interior opening interface.

22. A system for controlling a source of physiological affliction within a moveable enclosed structure defining an interior, comprising:

at least one infrasonic pressure fluctuation (infrasound) generator;

at least one pressure sensor located to sense pressure indicative of the interior of the structure; and at least one controller configured to:

determine, from pressure sensor information of the at least one pressure sensor, at least one infrasound disturbance within the interior of the structure; and control the at least one infrasonic pressure fluctuation (infrasound) generator to suppress the at least one infrasound disturbance within the interior of the structure, wherein the controller is further configured to use a model to calculate, from the pressure sensor information, an amount of the potential physiological affliction due to the at least one infrasound disturbance within the interior of the structure, wherein the model is for calculating an amount of motion sickness, as follows:

$$MSI = kPf^{\frac{1}{x}}\ln(t)$$

where:
P is pressure;
f is frequency of displacement;
t is exposure time;
k is a proportionality factor;
x is a constant; and
MSI is a Motion Sickness Incidence.

* * * * *